(12) United States Patent
Meyers et al.

(10) Patent No.: US 7,812,303 B2
(45) Date of Patent: Oct. 12, 2010

(54) METHOD AND SYSTEM FOR CREATING AN IMAGE USING QUANTUM PROPERTIES OF LIGHT BASED UPON SPATIAL INFORMATION FROM A SECOND LIGHT BEAM WHICH DOES NOT ILLUMINATE THE SUBJECT

(75) Inventors: Ronald E. Meyers, Columbia, MD (US); Keith S. Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 20 days.

(21) Appl. No.: 12/330,401

(22) Filed: Dec. 8, 2008

(65) Prior Publication Data
US 2010/0140458 A1  Jun. 10, 2010

Related U.S. Application Data

(60) Provisional application No. 60/992,792, filed on Dec. 6, 2007.

(51) Int. Cl.
*H01L 27/00* (2006.01)
(52) U.S. Cl. ..................... 250/208.1; 250/221
(58) Field of Classification Search ............ 250/208.1, 250/221, 203.2–203.6; 356/4.01, 141.1, 356/146, 147; 382/106–123, 190–216, 274–278
See application file for complete search history.

(56) References Cited

U.S. PATENT DOCUMENTS 4,929,951 A * 5/1990 Small ..................... 342/179

OTHER PUBLICATIONS

Cao, De-Zhong, et al., "Geometrical Optics in Coincidence Imaging System", arXiv:quant-ph/0407065v1, Jul. 8, 2004, pp. 1-9.

(Continued)

*Primary Examiner*—Que T Le
(74) *Attorney, Agent, or Firm*—Guy M. MIller; Lawrence E. Anderson

(57) ABSTRACT

A preferred embodiment comprises a method and system for generating an image of a subject or area comprising a processor; at least one incoherent light source which illuminates the subject or area; a first receiver for receiving light reflected from the subject or area operatively connected to the processor; a second receiver for receiving light from at least one incoherent light source operatively connected to the processor; the first receiver collecting the amount of light reflected from the subject and transmit a value at specific intervals of time; the second receiver comprising a second detector which detects and transmits spatial information regarding the incoherent light source independent of any data concerning the subject at specific intervals of time; wherein the processor correlates the value transmitted by the first receiver with the spatial information derived from the second receiver at correlating intervals of time to create an image of the subject or area. Alternatively, sound or quantum particles may replace the incoherent light source.

19 Claims, 16 Drawing Sheets

OTHER PUBLICATIONS

Wang, Kaige, et al., "Coincidence Subwavelength Interference by a Classical Thermal Light", arXiv:quant-ph/0404078v1, Apr. 13, 2004, pp. 1-6.

Valencia, Alejandra, et al., "Two-Photon Imaging with Thermal Light", Physical Review Letters, PRL 94, 063601 (2005), pp. 1-4.

Strekalov, D.V., et al, "Observation of Two-Photon "Ghost" Interference and Diffraction", Physical Review Letters, vol. 74, No. 18 (1995), The American Physical Society, pp. 3600-3603.

Scarcelli, Giuliano, et al., "Can Two-Photon Correlation of Chaotic Light Be Considered as Correlation of Intensity Fluctuations?", Physical Review Letters, PRL 96, 063602 (2006), pp. 1-4.

Pittman, T.B., et al., "Optical imaging by means of two-photon quantum entanglement", Physical Review A (Atomic, Molecular, and Optical Physics)., vol. 52, No. 5, Nov. 1995, pp. R3429-R3432.

Meyers, Ronald E., et al., "Quantum Ghost Imaging Experiments", Proc. Of SPIE vol. 6305, 6305N-1, pp. 1-14.

Klyshko, D.N., "A simple method of preparing pure states of an optical field, of implementing the Einstein-Podolsky-Rosen experiment, and of demonstrating the complementarity principle", Methodological Notes, Sov. Phy. Usp. 31 (1), Jan. 1988, American Institute of Physics, pp. 74-85.

Scarcelli, et al., Physical Review Letters, PRL 98, 039302 (2007), The American Physical Society, p. 1.

Bennink, Ryan S., et al., "Two-Photon" Coincidence Imaging with a Classical Source, Physical Review Letters, vol. 89, No. 11, Sep. 9, 2002, The American Physical Society, pp. 1-4.

Boto, Agedi N., et al., "Quantum Interferometric Optical Lithography: Exploiting Entanglement to Beat the Diffraction Limit", Physical Review Letters, vol. 85, No. 13, Sep. 25, 2000, The American Physical Society, pp. 2733-2736.

Cai, Yangjian, et al., "Ghost imaging with incoherent and partially coherent light radiation", Physical Review E 71. 056607 (2005), pp. 1-7.

D'Angelo, Milena, et al., "Two-Photon Diffraction and Quantum Lithography", Physical Review Letters, vol. 87, No. 1, Jul. 2, 2001, pp. 1-4.

D'Angelo, Milena, et al., "Resolution of quantum and classical ghost imaging", Physical Review A 72. 013810 (2005), The American Physical Society, pp. 1-19.

Einstein, A., et al., "Can Quantum-Mechanical Description of Physical Reality Be Considered Complete?", Physical Review, vol. 47, May 15, 1935, pp. 777-800.

Ferri, F. et al., "High-Resolution Ghost Image and Ghost Diffraction Experiments with Thermal Light", Physical Review Letters, PRL 94, 183602 (2005), The American Physical Society, pp. 1-4.

Gatti, A., et al., "Correlated imaging, quantum and classical", Physical Review A 70, 013802 (2004), The American Physical Society, pp. 1-10.

Letter entitled "Comment on Can Two-Photon Correlation of Chaotic Light Be Considered as Correlation of Intensity Fluctuations?", Physical Review Letters, PRL 98, 039301 (2007), The American Physical Society, p. 1.

Glauber, Roy J., "Coherent and Incoherent States of the Radiation Field", Physical Review, vol. 131, No. 6, Sep. 15, 1963, pp. 2766-2788.

Glauber, Roy J., "The Quantum Theory of Optical Coherence", Physical Review, vol. 130, No. 6, Jun. 15, 1963, pp. 2529-2539.

Brown, R. Hanbury, "Correlation Between Photons in Two Coherent Beams of Light", Nature, No. 4497, Jan. 7, 1956, pp. 27-29.

Brown, R. Hanbury, "A Test of a New Type of Stellar Interferometer on Sirius", Nature , vol. 178, Nov. 10, 1956, pp. 1046-1048.

Brown, R. Hanbury, "The Question of Correlation Between Photons in Coherent Light Rays", Nature, No. 4548, December 29, 1956, pp. 1447-1450.

Klyshko, D.N., "Combined EPR and Two-Slit Experiments: Interference of Advanced Waves", Physics Letters A, vol. 132, No. 6.7, pp. 299-304 (1988).

Zhang, Da, et al., "Correlated two-photon imaging with true thermal light", Optics Letters, vol. 30, No. 18, Sep. 15, 2005, pp. 2354-2356.

Meyers, Ron, et al., "A new two-photon ghost imaging experiment with distortion study", Journal of Modern Optics, vol. 54, Nos. 16-17, Nov. 10-20, 2007, 2381-2392.

Meyers, Ron, et al., "Ghost-imaging experiment by measuring reflected photons", Physical Review A 77, 041801(R), (Apr. 8, 2008), pp. 1-4.

Wang, Kaige, et al., "Coincidence Subwavelength Interference by a Classical Thermal Light", arXiv:quant-ph/0404078v1, Apr. 13, 2004, pp. 1-6.

Einstein, A., et al., "Can Quantum-Mechanical Description of Physical Reality Be Considered Complete?", Physical Review, vol. 47, May 15, 1935, pp. 777-780.

Wang, Kaige, et al., "Coincidence Subwavelength Interference by a Classical Thermal Light", arXiv:quant-ph/0404078v1, Apr. 13, 2004, pp. 1-6.

\* cited by examiner

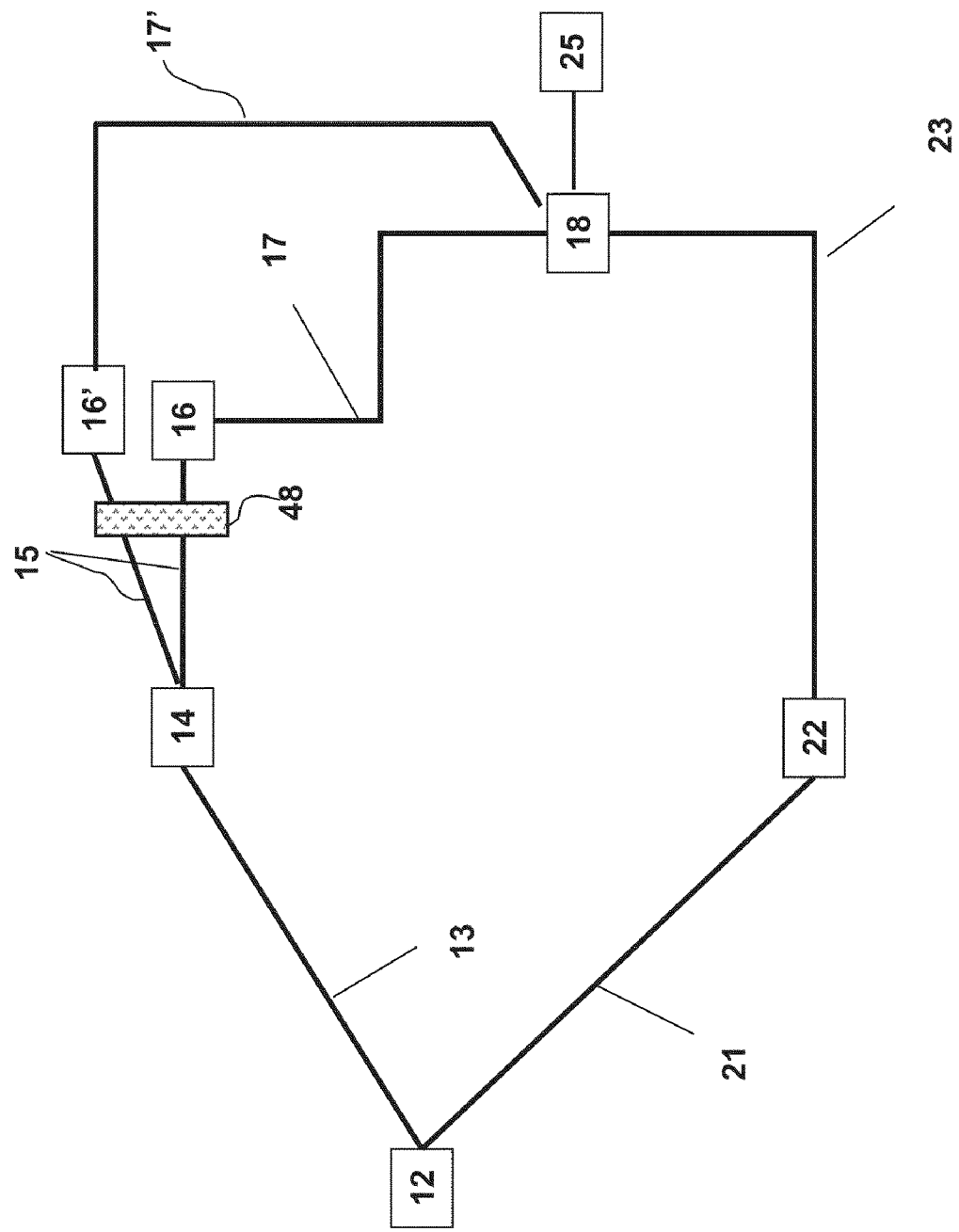

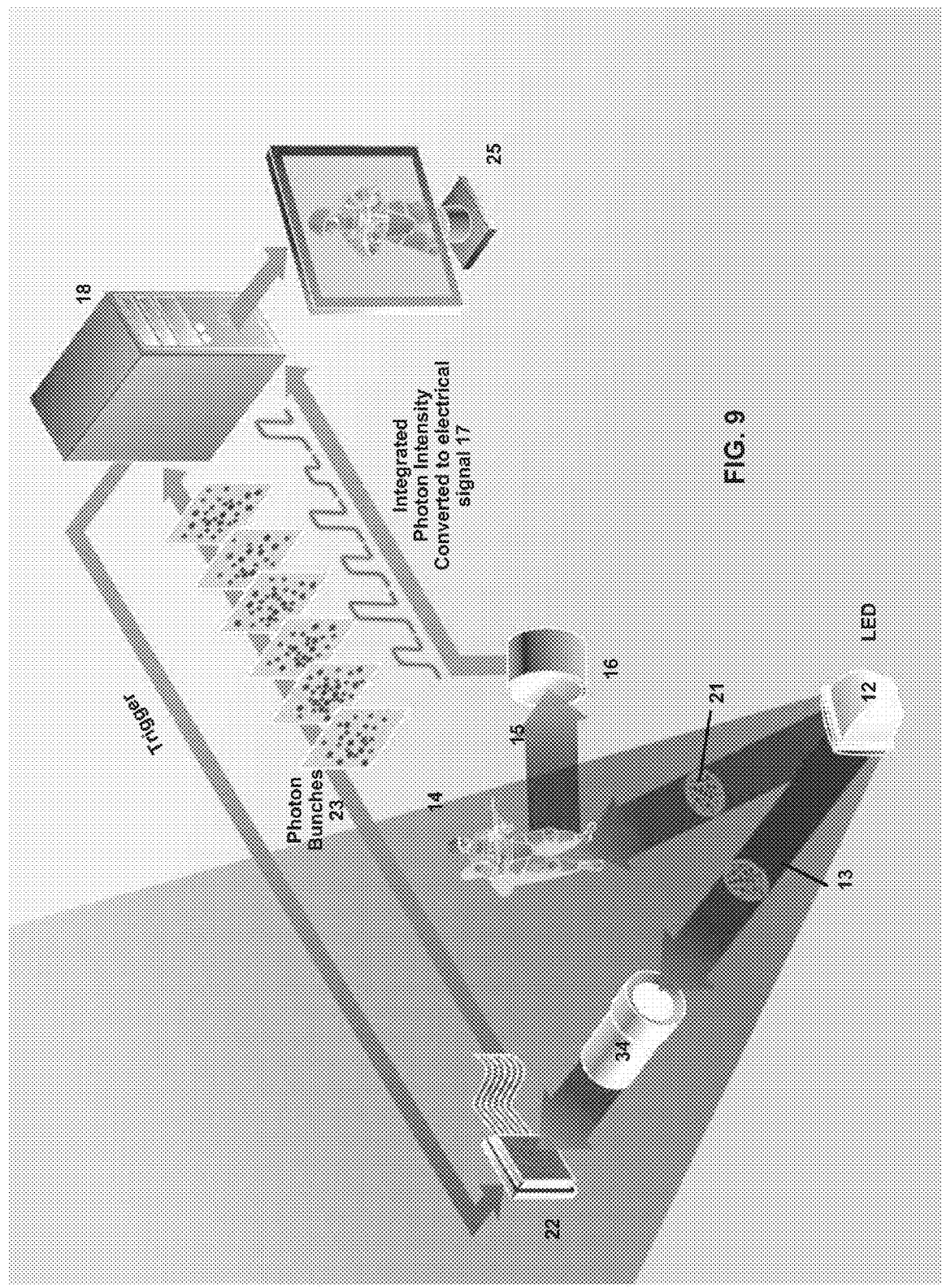

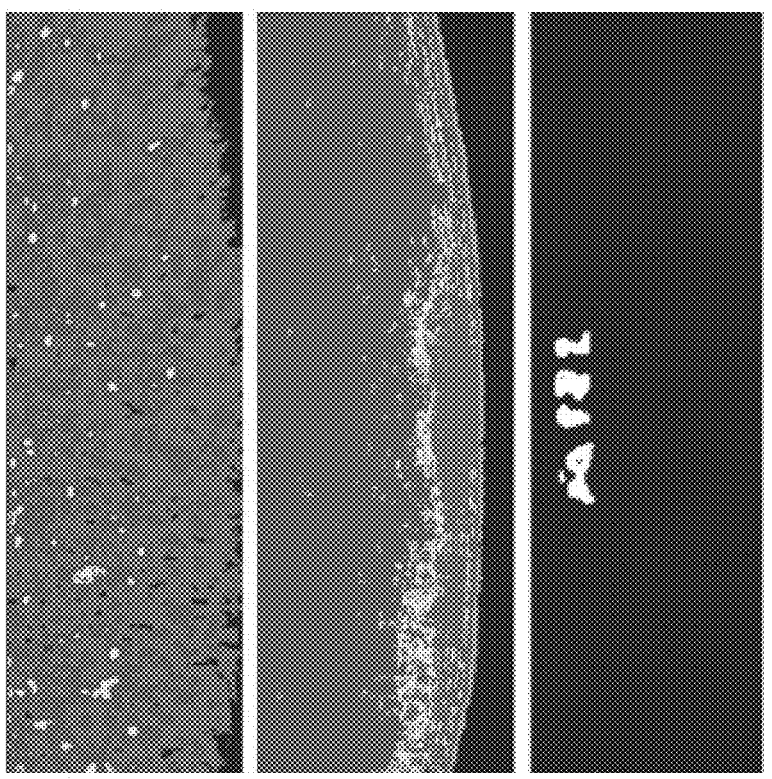
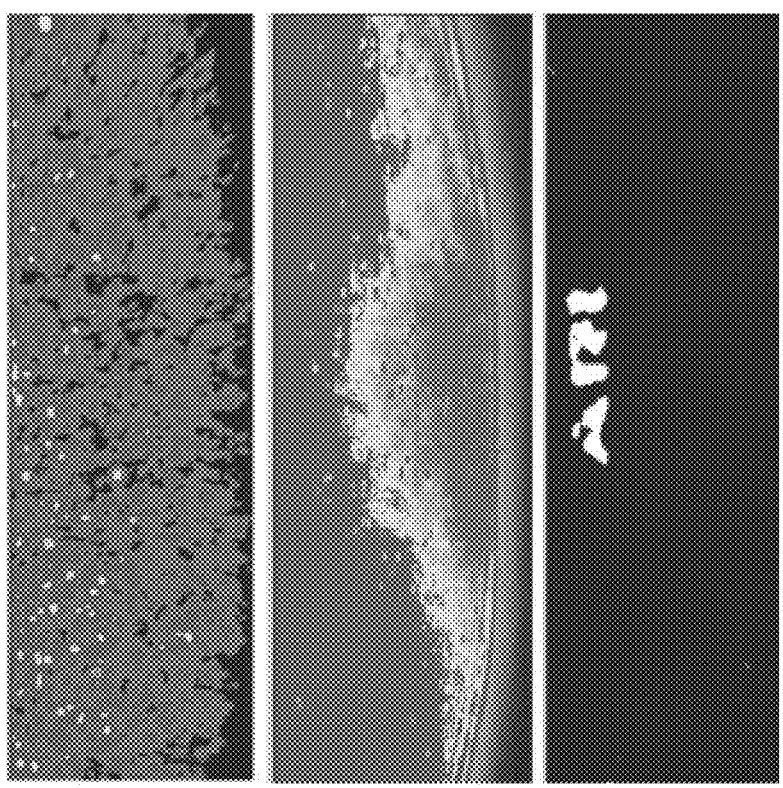
Fig. 12

METHOD AND SYSTEM FOR CREATING AN IMAGE USING QUANTUM PROPERTIES OF LIGHT BASED UPON SPATIAL INFORMATION FROM A SECOND LIGHT BEAM WHICH DOES NOT ILLUMINATE THE SUBJECT

CROSS-REFERENCE TO RELATED APPLICATIONS

This application claims priority of U.S. Provisional Patent Application Ser. No. 60/992,792 filed Dec. 6, 2007, which is incorporated herein by reference.

GOVERNMENT INTEREST

The invention described herein may be manufactured, used, and licensed by or for the United States Government.

FIELD OF THE INVENTION

This invention relates in general to a process and apparatus for quantum ghost imaging and in particular to a process using the properties of quantum ghost imaging to generate an image of an object via correlations between photons, sound or quantum particles reflected off the object and with photons, sound or quantum particles that have never interacted with the object.

The ability to image through obscuring media remains a problem in a variety of fields. By way of example, imaging of distant objects through the obscuring media of smoke or clouds is a problem that plagues satellite imaging analysts, firefighters, drivers, oceanographers, astronomers, military personnel, and medical personnel. The ability to improve resolution in each of these exemplary instances represents an opportunity to derive more information from images and presumably the decisions made from such images. By way of example, improved resolution in x-ray or endoscopy medical imagery facilitates lower radiation dosing and diagnosis of abnormal morphologies earlier than currently possible with conventional imaging methodologies. Conventional imaging techniques have, to a large extent, arrived at the theoretical limits of image resolution owing to wavelength-limited resolution, optical element distortions, and the reflective interaction between photons and an object to be imaged.

Ghost imaging holds the prospect of improving image spatial resolution but efforts in regard to ghost imaging have met with limited success owing to a lack of understanding of the phenomena.

Currently, quantum ghost imaging is largely dependent on the transmission of electromagnetic waves (photons) through the object to be imaged. However, in most real world applications, photonic transmission is impractical, and instead of object light reflection is the basis of image formation. Even in transmissive imaging such as x-ray imaging considerable image information occurs through consideration of reflection. Additionally, other objects can best be imaged using the fluorescence of the object when illuminated by an external light source.

The first two-photon imaging experiment was reported by Pittman et al. in "Optical Imaging by Means of Two-photon Quantum Entanglement," Physical Review A, Vol. 52, No. 5, November 1995. According to the article, a two-photon optical imaging experiment was performed based on the quantum nature of the signal and idler photon pairs produced in spontaneous parametric down-conversion. An aperture placed in front of a fixed detector was illuminated by a signal beam through a convex lens. A sharp magnified image of the aperture was found in the coincidence counting rate when a mobile detector is scanned in the transverse plane of the idler beam at a specific distance in relation to the lens. The experiment was named "ghost imaging" due to its surprising nonlocal feature, although the original purpose of the experiment was to study and to test the two-particle EPR correlation in position and in momentum for an entangled two-photon system. The experiments of ghost imaging in Pittman, et al. "Optical Imaging by Means of Two-Photon Entanglement," Phys. Rev. A, Rapid Comm., Vol. 52, R3429 (1995) and ghost interference by Strekalov, et al, "Observation of Two-Photon 'Ghost' Interference and Diffraction," Phys. Rev. Lett., Vol. 74, 3600 (1995) together stimulated the foundation of quantum imaging in terms of multi-photon geometrical and physical optics. The prior art transmissive ghost imaging optical scheme using entangled photons of Pittman et al. is depicted in FIG. 1.

This experiment was inspired by the theoretical work reported by Klyshko in Usp. Fiz. Nauk 154 133, Sov. Phys. Usp. 31, 74 (1988); Phys. Lett. A 132 299 (1988) suggesting a non-classical two-photon interaction could exist. The Pittman experiment was immediately named "ghost imaging" due to its surprising nonlocal feature. The important physics demonstrated in that experiment, nevertheless, may not be the "ghost". Indeed, the original purpose of the Pittman experiment was to study and to test the two-particle entanglement as originally detailed by Albert Einstein et al. (Einstein, Podolsky, Rosen) in Phys. Rev. 35 777 (1935) to determine if there was a correlation in position and in momentum for an entangled two-photon system. D'Angelo and colleagues in Phys. Rev. A 72, 013810 (2005) showed that ghost images produced by separable sources are subject to the standard statistical limitations. However, entangled states offer the possibility of overcoming such limitations to yield images that can achieve the fundamental limit through the high spatial resolution and nonlocal behavior of entangled systems.

Boto and colleagues in Phys. Rev. Lett. 85 2733 (2000) later developed an entangled multi-photon systems for sub-diffraction-limited imaging lithography and proposed a heuristic multiphoton absorption rate of a "noon" state and proved that the entangled N-photon system may improve the spatial resolution of an imaging system by a factor of N, despite the Rayleigh diffraction limit. The working principle of quantum lithography was experimentally demonstrated by D'Angelo et al. in 2001 by taking advantage of an entangled two-photon state of spontaneous parametric down-conversion as described in Phys. Rev. Lett. 87 013603.

Quantum imaging has so far demonstrated two peculiar features: (1) reproducing ghost images in a "nonlocal" manner, and (2) enhancing the spatial resolution of imaging beyond the diffraction limit. Both the nonlocal behavior observed in the ghost imaging experiment and the apparent violation of the uncertainty principle explored in the quantum lithography experiment are due to the two-photon coherent effect of entangled states, which involves the superposition of two-photon amplitudes, a nonclassical entity corresponding to different yet indistinguishable alternative ways of triggering a joint-detection event in the quantum theory of photodetection as articulated by Glauber in Phys. Rev. 130 2529 (1963); and Phys. Rev. 131 2766 (1963). The nonlocal superposition of two-photon states may never be understood classically. Classical attempts, however, have never stopped in the history of EPR studies as evidenced by Bennink et al., who demonstrated 2002 by experiment, two co-rotated laser beams produced a projection shadow of an object mask through coincidence measurements as published in Phys.

Rev. Lett. 89 113601 (2002). Instead of having a superposition of a large number of two-photon amplitudes, Bennink et al. used two correlated laser beams (imagine two back to back lasers) to simulate each two-photon amplitude one at a time. If the laser beam in the object arm is blocked by the mask at a certain rotating angle, there would be no coincidence in that angle and consequently defines a corresponding "position" in the nonlocal "image" plane. The block-unblock of the correlated laser beams thus projects a shadow of the object mask in coincidences. Interestingly, this experiment has excited a number of discussions concerning certain historical realistic models of EPR (Einstein, Podolsky, Rosen). Apparently, Bennink et al. have provided experimental evidence to support the concept of classical physical reality. Perhaps, the use of a transmitting mask as the object aperture function in the historical ghost imaging experiments may have been a factor responsible for this confused wrong idea.

The classical argument seems to get more support from thermal light ghost imaging, because thermal light itself is considered as classical. Thermal light ghost imaging was proposed in 2004 by Gatti et al. in Phys. Rev. A 70 013802, Wang and co-workers in quant-ph/0404078 and quant-ph/0407065, and Cai and Zhu in Phys. Rev. E 71 056607.

Thermal light ghost imaging for thermalized photons with a single CCD camera was used by Gatti et al. The main purpose was to simulate the two-photon correlation of entangled states by a classical source. In fact, two-photon correlation of thermal radiation is not a new observation. Hanbury-Brown and Twiss (HBT) demonstrated the second-order correlation of thermal light spatially (transverse) and temporally (longitudinal) in 1956 as published in Nature 177 28, and Nature 178 1046, and Nature 178 1447. Differing from entangled states, the correlation in chaotic radiation is only "partial", which means 50% visibility at most. Nevertheless, chaotic light is a useful candidate for ghost imaging in certain applications. Recently, a number of experiments successfully demonstrated certain interesting features of ghost imaging by using chaotic light. Representative of these experiments using chaotic light are those by A. Valencia and colleagues in Phys. Rev. Lett. 94 063601 (2005); Scarcelli and colleagues in Phys. Rev. Lett. 96 063602 (2006); Ferri and colleagues in Phys. Rev. Lett. 94 183602 (2005); and Zhang and colleagues in Opt. Lett. 30 2354 (2005). A prior art transmissive ghost imaging optical scheme using thermalized photons Meyers/Deacon "Quantum Ghost Imaging Experiments," SPIE Proceedings Vol. 6305 (2006) is depicted in FIG. 2.

The HBT experiment was successfully interpreted as statistical correlation of intensity fluctuations instead of two-photon coherence. A question about two-photon ghost imaging is then naturally raised: is the physics behind ghost imaging phenomenon a classical correlation of intensity fluctuations too? To answer this question, Scarcelli et al. in Phys. Rev. Lett. 96 063602 (2006) demonstrated a near-field ghost imaging of chaotic radiation. FIG. 3 is a prior art optical scheme for these experiments. In this work, Scarcelli et al. pointed out that (1) the classical interpretation leads to non-physical conclusions in the case of entangled two-photon ghost imaging; and (2) even if the classical interpretation may work for HBT, it will not work for the near-field ghost imaging of chaotic radiation. HBT correlation is measured in far-field, which is essentially a momentum-momentum self-correlation of a radiation mode. In the Scarcelli et al. experimental setup, however, the measurement is in near-field. In the near-field, for each position on the detection plane, a point photodetector receives a large number of modes in the measurement. The classical interpretation of statistical correlation of intensity fluctuations will not work in this experimental setup, as we know that different modes of chaotic light fluctuate randomly and independently. The fluctuations will cancel each other if more than one mode is involved in the measurement. On the other hand, Scarcelli et al. proved a successful alternative interpretation in terms of two-photon interference.

The experiment of Scarcelli et al. published in Phys. Rev. Lett. 98 039302 (2007) that builds on the earlier work of this group detailed above has not been able to convince Gatti et al. that ghost imaging is quantum in nature as evidenced by the publication of Gatti et al. in Phys. Rev. Lett. 98 039301. This ongoing lack of theoretical understanding of ghost imaging has hampered efforts to develop reflective ghost imaging systems for practical field uses in such fields as satellite, field, medical and research imaging.

Thus, there exists a need for a ghost imaging that is not dependent on the transmission properties of the object. Furthermore, there is a need for ghost imaging the multi-spectral properties of an object. An additional need exists for an imaging system that is tolerant of the scattering and distortion of an image as photons propagate through a distortion medium.

Ghost imaging in the prior art was dependent upon the transmission properties of an object. Accordingly, there exists a need for image creation where the transmission of light through the object is not possible or advantageous, such as when the object is opaque. Thus, there exists a need for an imaging system wherein light can be reflected from an object for subsequent image transmission.

In conventional image generation systems, a sufficient bandwidth necessary to transmit an image. There exists a need for image generation whereby the image can be generated and transmitted using minimal bandwidth, such as for example, using voltage detection readings.

Generally speaking, for the two dimensional (2D) images, there are two major graphic types: bitmap and vector image graphics. Three dimensional (3D) images are similarly formed with more complicated positional information relating to the third dimension.

A bitmap (or pixmap) image file format contains spatial information as to the location of the pixel or "bites" within the image or picture being transmitted. The term bitmap is derived from a mapped array of bits, and bitmapped and pixmap refer to the similar concept of a spatially mapped array of pixels. Both bitmapped and pixmapped formats contain spatial information. Raster graphics is the representation of images as an array of pixels.

Vector graphics are computer images that are stored and displayed in terms of vectors rather than points. Vector graphics utilizes, inter alia, points, lines, curves, and shapes or polygon(s), which are all based upon mathematical equations, to represent images in computer graphics.

Both bitmap and vector images utilize spatial information. A feature of a preferred embodiment of the present invention enables the transmission of an image without spatial information. As used herein the terminology "without spatial information" is defined as without positional information (such as that found in bitmap or pix map), or vector information such as that found in vector imaging.

SUMMARY OF THE INVENTION

A preferred embodiment of the present invention utilizes the concept that if the light generation source may be analyzed at a remote location, an image may be detected by a detector for which the output is a voltage measurement.

The source of radiation may be one of an entangled, thermal/incoherent (sun, light bulb, flame, environmental radiation), or chaotic light source. Thermal is a type of incoherent light. The present invention may be practiced using all wavelength forms of light (e.g., X-rays, visible, etc.). The photons from the light source are divided into two paths. In one path is the object to be imaged, in the other path images of the entangled, thermal, or chaotic light are measured independent of interaction with the objects. Any or all paths may pass through an obscuring medium. The measurements of the entangled, thermal, or chaotic light are then stored for future processing. The light in the object path is collected into a bucket detector and measured. The measurements of the bucket detector are then stored for future processing. A process for solving for the $G^{(2)}$ Glauber coherence between the two paths is provided to reconstruct the image. The $G^{(2)}$ Glauber coherence between the two paths is used to generate a correlation two-photon ghost image. The present invention is not limited to photons and can be conducted with any quantum particle. The principles of the present invention are not limited to light and may be practiced utilizing, e.g., using sound, electron, proton or neutron sources as the "illuminating" component of the ghost imager. Moreover, the obscuring materials may comprise foliage or vegetation in remote sensing applications and tissue in medical applications Ghost imaging may be used to achieve higher resolution than the standard Rayleigh diffraction limit using entangled or non-entangled quantum particles or other forms of radiation referenced herein.

The present invention is directed to a ghost imaging system that provides reflective object imaging with an improved sensitivity in the presence of an obscuring medium. In contrast to classical reflective object imaging, in accordance with an embodiment of the present invention, the photon ghost image is theoretically less dependent on image distortion associated with photon transit through obscuring medium and in practice there is only nominal image distortion associated with light traveling through an obscuring medium when utilizing a preferred embodiment ghost imaging system. Representative obscuring media according to the present invention illustratively include fog, an aerosol, particulate whether suspended in air, water, or vacuum media; turbulence; liquid, vegetation, foliage, tissue, sand, or frosted glass.

The present invention uses radiation from an entangled, thermal, or chaotic light source to generate ghost images. The photons from the light source are divided into two paths. In one path is the object to be imaged, in the other path images of the entangled, thermal, or chaotic light are measured independent of interaction with the objects. Any or all paths may pass through an obscuring medium. The measurements of the entangled, thermal, or chaotic light are then stored for future processing. The light in the object path is collected into a bucket detector and measured. The measurements of the bucket detector are then stored for future processing. A process for solving for the $G^{(2)}$ Glauber coherence of Equation 3 (provide hereafter) between the two paths is provided to reconstruct the image. This coherence between the two paths is used to generate a correlation two-photon ghost image. One or more bucket detectors are used along with a spatially addressable detector to generate images from the joint-detection correlations between the bucket detectors and the single-pixel detector(s). The resultant ghost corresponds to a convolution between the aperture function, or the amplitude distribution function, of the object and a δ-function like second-order correlation function of Glauber coherence. Furthermore, the bucket detectors may be a charged coupled device (CCD) operating as a spatially integrated detector. Alternatively, the spatially integrated detector may further comprise means for modifying sensitivity of specific pixels on the spatially integrated detector prior to producing the bucket detector signal. For example, acting as a diffraction grating of a certain order or imprinting an identification mark. Any array of detectors that covers an area or any detector that scans an area may be used in place of a CCD.

BRIEF DESCRIPTION OF THE DRAWINGS

FIG. 4 is a schematic diagram of a generic inventive ghost imaging system;

FIG. 9 is a perspective schematic view of quantum ghost imaging generated with a correlated photons of a light emitting diode (LED) incoherent light source;

FIG. 12 is a set of images depicting the results of a reflection ghost imaging experiment wherein the light path to the bucket detector passes through an obscuring medium; FIG. 12A is an instantaneous image of the spatially varying intensity of light source; FIG. 12B is an averaged image of the light source; FIG. 12C is the $G^{(2)}$ image of the obscured object reflection; FIG. 12D is an instantaneous image of the light source; object reflection; and FIG. 12E is an averaged image of the source; FIG. 12F is the $G^{(2)}$ image of object reflection. In this example the location of the obscuring medium is at position 15 of FIG. 5. However, the inventive process compensates for obscuring medium regardless of location.

DESCRIPTION OF THE PREFERRED EMBODIMENTS

Figure 1:
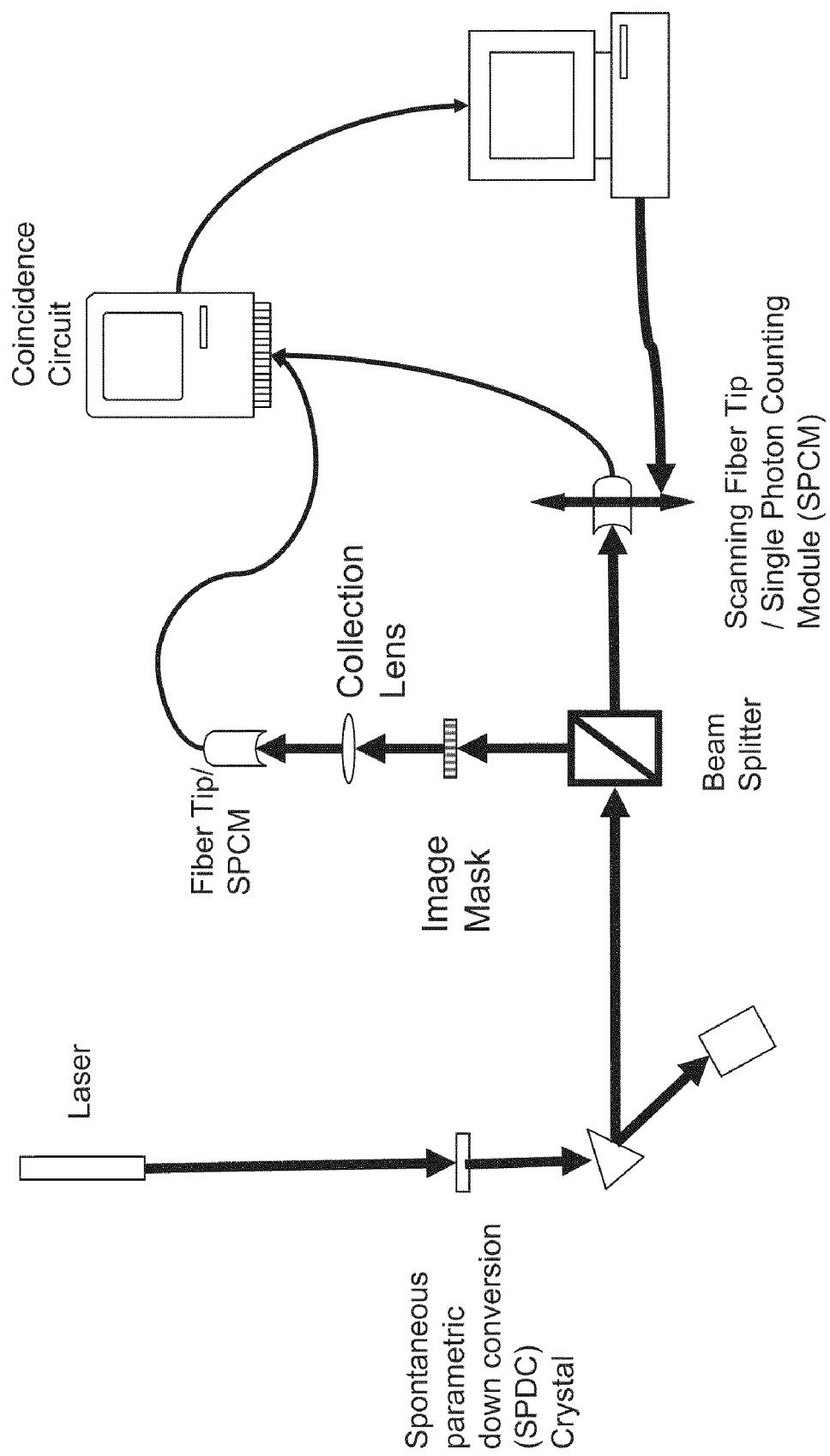
FIG. 1 is a prior art scheme depicting a quantum ghost imaging technique based on object transmission using entangled photons.
Figure 2:
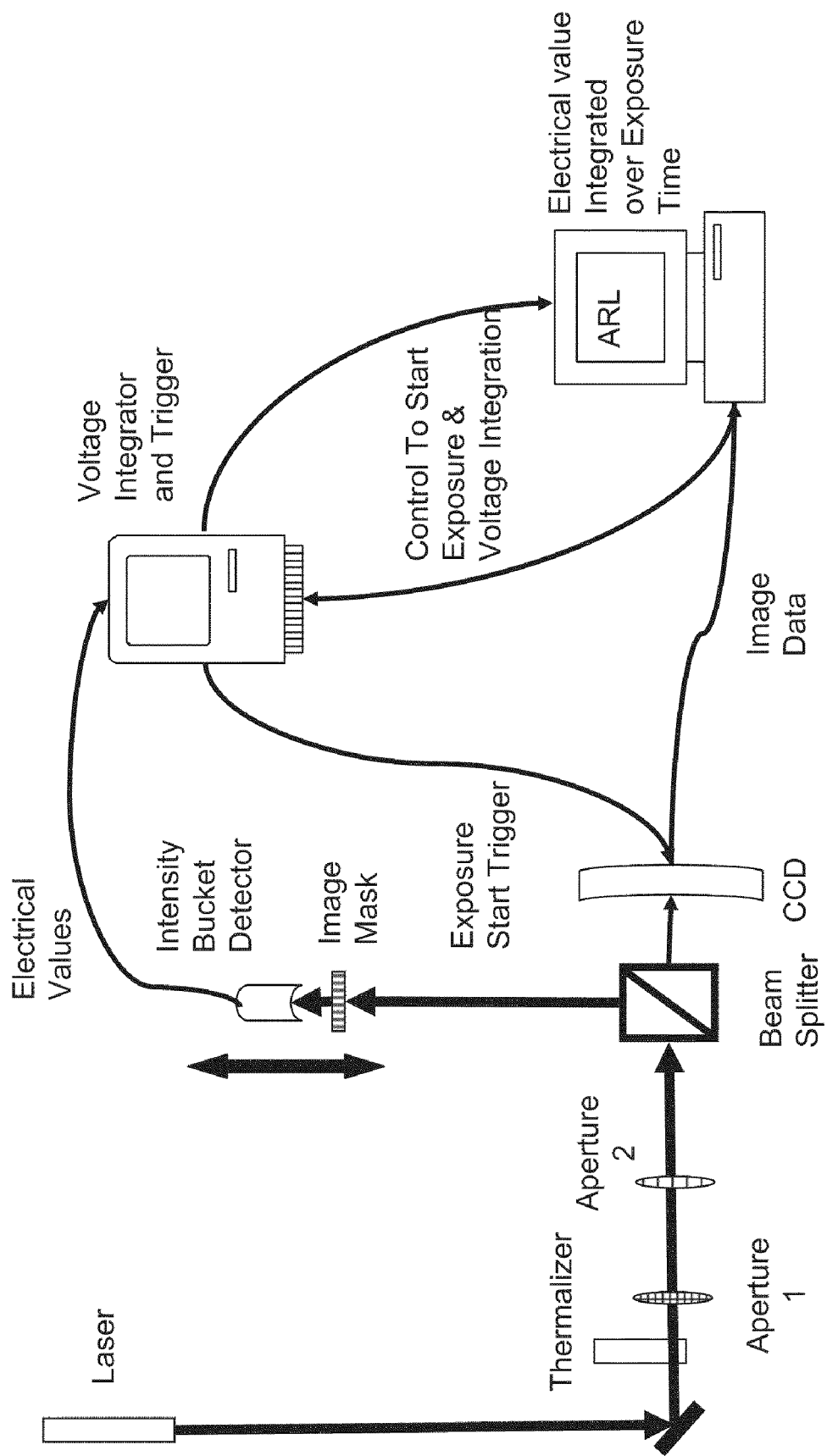
FIG. 2 is a prior art schematic depicting a quantum ghost imaging technique based on object transmission using thermalized light photons.
Figure 3:
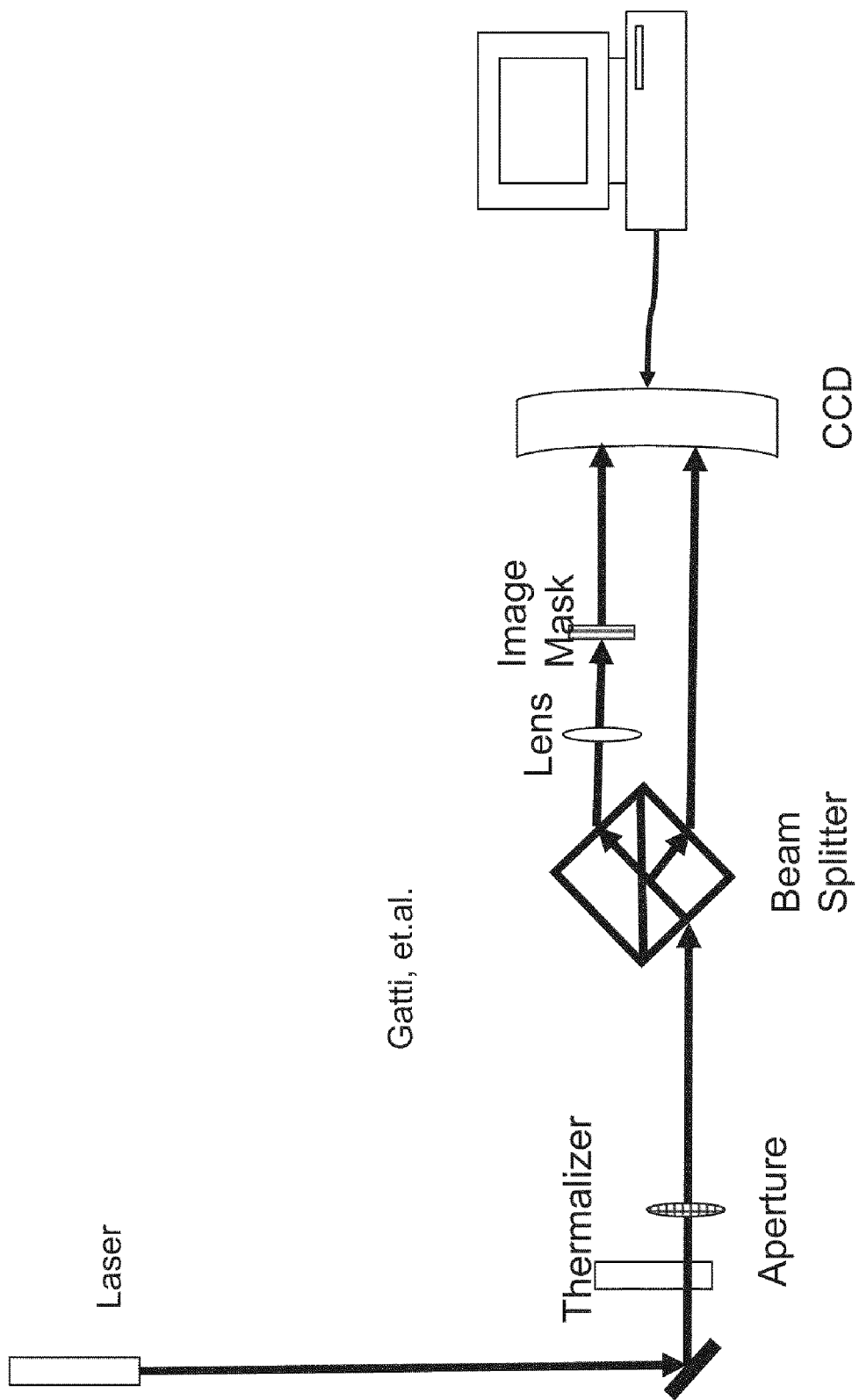
FIG. 3 is a prior art schematic depicting a quantum ghost imaging technique using thermalized light photons and a single CCD.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The present invention has utility as a ghost imaging system that provides reflective object imaging with an improved sensitivity in the presence of an obscuring medium. In contrast to conventional reflective object imaging, the imaging conducted in accordance with the principles of the present invention, referred to as a photon ghost image, is capable of being substantially independent of image distortion associated with photon transit through obscuring media and practically has only nominal image distortion associated with light in ghost imaging system operating in an obscuring medium constructed in accordance with the principles of the present invention. Representative obscuring media according to the present invention illustratively include fog, an aerosol, particulate whether suspended in air, water, or vacuum media; turbulence; liquid or frosted glass.

Ghost imaging may be used to achieve higher resolution than the standard Rayleigh diffraction limit using entangled or non-entangled quantum particles or other forms of radiation referenced herein.

A preferred embodiment of the present invention uses radiation from an entangled, thermal, or chaotic light source to generate ghost images. The photons from the light source are divided into two paths. This may be accomplished for example, by a beamsplitter, which is an optical component that allows part of an electromagnetic beam to pass through and reflects the rest. Beamsplitters can be, but are not restricted to, cemented right prisms or partially silvered mirrors In addition, in the case of naturally occurring sunlight, which can be divided into two different paths by other means, beam splitting is unnecessary. For example, in the embodiment shown in FIG. 5A, if the light source 12 is sunlight that radiates in multiple path directions, then the beamsplitter 28 may be omitted.

In a first path is the object to be imaged, in the second path images of the entangled, thermal, or chaotic light are measured independent of interaction with the objects. Either or both paths may pass through an obscuring medium. The measurements of the entangled, thermal, or chaotic light are then stored for future processing. The photons in the first or object path are collected by a bucket detector and measured. As used herein, the term bucket detector includes a photo sensor that collects all the light scattered and incident on it without regard to spatial information; e.g., a lens with a photodiode at the focal point of the lens. Measurements from the bucket detector are then stored for future processing. A process for solving for the $G^{(2)}$ Glauber coherence between the two paths is provided to reconstruct the image. The $G^{(2)}$ Glauber coherence between the two paths is used to generate a correlation two-photon ghost image. One or more bucket detectors are used along with a spatially addressable detector to generate images from the joint-detection correlations between the bucket detectors and the single-pixel detector(s). The resultant "ghost" corresponds to a convolution between the aperture function, or the amplitude distribution function, of the object $A(\vec{\rho}_o)$ and a $\delta$-function like second-order correlation function $G^{(2)}(\vec{\rho}_o, \vec{\rho}_i)$ as provided by Klyshko in Usp. Fiz. Nauk 154 133, Sov. Phys. Usp. 31, 74 (1988); or Phys. Lett. A 132299 (1988):

$$F(\vec{\rho}_i) = \int_{obj} d\vec{\rho}_o A(\vec{\rho}_o) G^{(2)}(\vec{\rho}_o, \vec{\rho}_i) \cong \int_{obj} d\vec{\rho}_o A(\vec{\rho}_o) \delta(\vec{\rho}_o - \vec{\rho}_i/m)_o) \quad (1)$$

The $\delta$-function characterizes a perfect point-to-point relationship between the object plane and the image plane. If the image comes with a constant background the second-order correction function $G^{(2)}(\vec{\rho}_o, \vec{\rho}_i)$ in Eq. (1) must be composed of two parts:

$$G^{(2)}(\vec{\rho}_o, \vec{\rho}_i) = G_0 + \delta(\vec{\rho}_o - \vec{\rho}_i/m) \quad (2)$$

where $G_0$ is a constant. The value of $G_0$ determines the visibility of the image. Examining Eq. (2), one may recognize that this $G^{(2)}$ function can be expressed as:

$$G^{(2)}(\vec{\rho}_o, \vec{\rho}_i) = G_{11}^{(1)}(\vec{\rho}_1, \vec{\rho}_1) G_{22}^{(1)}(\vec{\rho}_2, \vec{\rho}_2) + G_{12}^{(1)}(\vec{\rho}_1, \vec{\rho}_2) G_{21}^{(1)}(\vec{\rho}_2, \vec{\rho}_1) \quad (3)$$

where $G_{11}^{(1)} G_{22}^{(1)}$ is approximately equal to $G_0$ and $G_0$ is a constant, and $G_{12}^{(1)} G_{21}^{(1)}$ is approximately equal to $\delta(\vec{\rho}_1 - \vec{\rho}_2)$ where $\delta(\vec{\rho}_1 - \vec{\rho}_2)$ represents the $\delta$-function non-local position-position correlation; and $\rho_1$ and $\rho_2$ are the transverse spatial coordinates of the first and second detectors respectively. Note that the superscript of the $G^{(n)}$ functions indicates the order (n) of the correlation of the measurements, and is not a reference or a footnote.

An imaging system according to the present invention is shown in FIGS. 4, 5A, 6, 7A, 8A, 8B, 9, and 10 where like reference numerals used among the figures have like meaning. Light source 12 represents an incoherent, partially coherent or chaotic light source that is operative in an air medium as the source of the illuminating light. An object 14 receives a light source output 13 and reflects light along path 15. The reflected light output 15 is collected by a bucket detector 16 and integrated for some exposure time. The integrated values of the intensity of output 15 are transmitted via path 17 to the two-photon correlation computation subsystem 18. Paths 17, 17' and 23 may utilize any form of a data route, such as a wire, radio frequency (RF) transmission field, or an optical path. Output 21 from a beam splitter 28 is collected by a spatially addressable detector 22, which may be, e.g., a CMOS, CCD (charge coupled device array and/or scanning fiber tip), that is observing the source 12 for the same exposure time at the bucket detector 16. The spatially addressable intensity values are transmitted via path 23 to the two-photon correlation computation subsystem 18, which may include a computer, processor, etc., and, include for example a coincidence circuit. Subsystem 18, computes the two-photon correlation quantum ghost image in accordance with Equation 3 above, utilizing the input values from paths 17 and 23, and displays a correlated two-photon quantum image on a monitor 25, as shown in FIG. 4. Additionally, one or more bucket detectors 16' are optionally deployed in an inventive ghost imaging system such as those detailed with respect to FIGS. 4, 5A, 6, 7A, 8A, 8B, 9, and 10. An additional bucket detector 16', positioned at a different angle, is operative to observe the object 14 with an angular distinct reflection relative to the detector 16 as illuminated by the light source or, alternatively, the additional detector 16' may observe a second object illuminated by the same light source. The detector 16' collects reflected light 15 reflected from object 14 and integrated values of the intensity of reflected light 15 are transmitted path 17' to the two-photon correlation computation subsystem 18. It is appreciated with angularly distinct detection of the same object by detectors 16 and 16', that stereoscopic information about the object is so obtained. Furthermore, there could be a plurality of detectors, and the additional detector 16' is merely illustrative of this principle of the present invention. If n quantity of detectors are looking at the same object, subsystem 18 may be modified to calculate the $G^{(n+1)}$ correlation image to enhance or increase the contrast and/or resolution.

An object 14, in addition to being a three-dimensional opaque object, the object 14 may also be a semi-opaque or opaque mask from which scattered and reflected entangled photons can be collected upon merging with another photon of an entangled pair which is operative as a reference photon. An example of this opaque mask is found in U.S. patent application Ser. No. 10/900,351, hereby incorporated by reference as though fully rewritten herein. The reference photon thereby acts as an ancilla which may be saved for a time period equal to that over which the reflecting or scattering photon takes to merge into the photon stream. The term ancilla as used herein refers to a unit of ancillary information utilized for an addition check or verification. The existence of the entangled photon pair in the merge stream (as shown in FIG. 5 of U.S. patent application Ser. No. 10/900,351, between elements 218 and 220) is indicative that one of the entangled photons of the pair has reflected or scattered from the object and thereby identifies the existence of the object. A significant number of entangled photon pairs provide ghost image data as to the shape of the object, which is determined from the entangled photon pair measurement according to the present invention. The present invention may also be used for encryption and coding purposes as described in the U.S. patent application Ser. No. 10/900,351, hereby incorporated by reference.

A ghost image is the result of a convolution between the aperture function (amplitude distribution function) of the object $A(\vec{\rho}_o)$ and a $\delta$-function like second-order correlation function $G^{(2)}(\vec{\rho}_o, \vec{\rho}_i)$ $$F(\vec{\rho}_i) = \int_{obj} d\vec{\rho}_o A(\vec{\rho}_o) G^{(2)}(\vec{\rho}_o, \vec{\rho}_i) \quad (1)$$

where $G^{(2)}(\vec{\rho}_o, \vec{\rho}_i) \cong \delta(\vec{\rho}_o - \vec{\rho}_i/m)$, $\vec{\rho}_o$ and $\vec{\rho}_i$ are 2D vectors of the transverse coordinate in the object plane and the image plane, respectively, and m is the magnification factor. The term $\delta$ function as used herein relates to the Dirac delta function which is a mathematical construct representing an infinitely sharp peak bounding unit area expressed as δ(x), that has the value zero everywhere except at x=0 where its value is infinitely large in such a way that its total integral is 1. The δ function characterizes the perfect point-to-point relationship between the object plane and the image plane. If the image comes with a constant background, as in this experiment, the second-order correlation function $G^{(2)}(\vec{\rho}_o, \vec{\rho}_i)$ in Eq. (1) must be composed of two parts $$G^{(2)}(\vec{\rho}_o, \vec{\rho}_i) = G_0 + \delta(\vec{\rho}_o - \vec{\rho}_i/m), \quad (2)$$

where $G_0$ is a constant. The value of $G_0$ determines the visibility of the image. One may immediately connect Eq. (2) with the $G^{(2)}$ function of thermal radiation $$G^{(2)} = G_{11}^{(1)} G_{22}^{(1)} + |G_{12}^{(1)}|^2, \quad (3)$$

where $G_{11}^{(1)} G_{22}^{(1)} \sim G_0$ is a constant, and $|G_{12}^{(1)}|^2 \sim \delta(\vec{\rho}_1 - \vec{\rho}_2)$ represents a nonlocal position-to-position correlation. Although the second-order correlation function $G^{(2)}$ is formally written in terms of $G^{(1)}$ is as shown in equation (3), the physics are completely different. As we know, $G_{12}^{(1)}$ is usually measured by one photodetector representing the first-order coherence of the field, i.e., the ability of observing first-order interference. Here, in Eq. (3), $G_{12}^{(1)}$ is measured by two independent photodetectors at distant space-time points and represents a nonlocal EPR correlation.

Differing from the phenomenological classical theory of intensity-intensity correlation, the quantum theory of joint photodetection, known conventionally as Glauber's theory and published in Phys. Rev. 130, 2529 (1963); and Phys. Rev. 131, 2766 (1963) dips into the physical origin of the phenomenon. The theory gives the probability of a specified joint photodetection event $$G^{(2)} = Tr[\hat{\rho} E^{(-)}(\vec{\rho}_1) E^{(-)}(\vec{\rho}_2) E^{(+)}(\vec{\rho}_2) E^{(+)}(\vec{\rho}_1)], \quad (4)$$

and leaves room for us to identify the superposed probability amplitudes. In Eq. (4), $E^{(-)}$ and $E^{(+)}$ are the negative and positive-frequency field operators at space-time coordinates of the photodetection event and $\hat{\rho}$ represents the density operator describing the radiation. In Eq. (4), we have simplified the calculation to 2D.

In the photon counting regime, it is reasonable to model the thermal light in terms of single photon states for joint detection, $$\hat{\rho} \simeq |0\rangle\langle 0| + |\epsilon|^4 \sum_{\vec{\kappa}} \sum_{\vec{\kappa}'} \hat{a}^\dagger(\vec{\kappa}) \hat{a}^\dagger(\vec{\kappa}') |0\rangle\langle 0| \hat{a}(\vec{\kappa}') \hat{a}(\vec{\kappa}), \quad (5)$$

where $|\epsilon| \ll 1$. Basically, we model the state of thermal radiation, which results in a joint-detection event, as a statistical mixture of two photons with equal probability of having any transverse momentum $\vec{\kappa}$ and $\vec{\kappa}'$.

Assuming a large number of atoms that are ready for two-level atomic transition. At most times, the atoms are in their ground state. There is, however, a small chance for each atom to be excited to a higher energy level and later release a photon during an atomic transition from the higher energy level $E_2(\Delta E_2 \neq 0)$ back to the ground state $E_1$. It is reasonable to assume that each atomic transition excites the field into the following state:

$$|\Psi\rangle \simeq |0\rangle + \epsilon \sum_{k,s} f(k,s) \hat{a}_{k,s}^\dagger |0\rangle,$$

where $|\epsilon| \ll 1$ is the probability amplitude for the atomic transition. Within the atomic transition, $f(k,s) = \langle \psi_{k,s} | \psi \rangle$ is the probability amplitude for the radiation field to be in the single-photon state of wave number k and polarization s: $|\psi_{k,s}\rangle = |1_{k,s}\rangle = \hat{a}_{k,s}^\dagger |0\rangle$.

For this simplified two-level system, the density matrix that characterizes the state of the radiation field excited by a large number of possible atomic transitions is thus $$\hat{\rho} = \prod_{t_{0j}} \left\{ |0\rangle + \epsilon \sum_{k,s} f(k,s) e^{-i\omega t_{0j}} \hat{a}_{k,s}^\dagger |0\rangle \right\} \times$$

$$\prod_{t_{0k}} \left\{ \langle 0| + \epsilon^* \sum_{k',s'} f(k',s') e^{i\omega' t_{0k}} \langle 0| \hat{a}_{k',s'} \right\} \simeq$$

$$\left\{ |0\rangle + \epsilon \left[ \sum_{t_{0j}} \sum_{k,s} f(k,s) e^{-i\omega t_{0j}} \hat{a}_{k,s}^\dagger |0\rangle \right] + \epsilon^2 [\ldots] \right\} \times$$

$$\left\{ \langle 0| + \epsilon^* \left[ \sum_{t_{0k}} \sum_{k',s'} f(k',s') e^{i\omega' t_{0k}} \langle 0| \hat{a}_{k',s'} \right] + \epsilon^{*2} [\ldots] \right\},$$

where $e^{-i\omega t_{0j}}$ is a random phase factor associated with the state $|\psi_j\rangle$ of the jth atomic transition. Summing over $t_{0j}$ and $t_{0k}$ by taking all possible values, we find the approximation to the fourth order of $|\epsilon|$, $$\hat{\rho} \simeq |0\rangle\langle 0| + |\epsilon|^2 \sum_{k,s} |f(k,s)|^2 |1_{k,s}\rangle\langle 1_{k,s}| +$$

$$|\epsilon|^4 \sum_{k,s} \sum_{k',s'} |f(k,s)|^2 |f(k',s')|^2 |1_{k,s} 1_{k',s'}\rangle\langle 1_{k,s} 1_{k',s'}|.$$

The second-order transverse spatial correlation function is thus $$G^{(2)}(\vec{\rho}_1, \vec{\rho}_2) = \sum_{\vec{\kappa}} \sum_{\vec{\kappa}'} |\langle 0| E_2^{(+)}(\vec{\rho}_2) E_1^{(+)}(\vec{\rho}_1) |1_{\vec{\kappa}} 1_{\vec{\kappa}'}\rangle|^2. \quad (6)$$

The electric field operator, in terms of the transverse mode and coordinates, can be written as follows:

$$E_j^{(+)}(\vec{\rho}_j) \propto \sum_{\vec{\kappa}} g_j(\vec{\kappa}; \vec{\rho}_j) \hat{a}(\vec{\kappa}), \quad (7)$$

where $\hat{a}_{\vec{\kappa}}$ is the annihilation operator for the mode corresponding to $\vec{\kappa}$ and $g_j(\vec{\rho}_i; \vec{\kappa})$ is the Green's function associated with the propagation of the field from the source to the jth detector [23]. Substituting the field operators into Eq. (6), we obtain $$G^{(2)}(\vec{\rho}_1, \vec{\rho}_2) = \sum_{\vec{\kappa}, \vec{\kappa}'} |g_2(\vec{\kappa}; \vec{\rho}_2)g_1(\vec{\kappa}'; \vec{\rho}_1) + g_2(\vec{\kappa}'; \vec{\rho}_2)g_1(\vec{\kappa}; \vec{\rho}_1)|^2. \quad (8)$$

Eq. (8) indicates a two-photon superposition. The superposition happens between two different yet indistinguishable Feynman alternatives that lead to a joint photodetection: (1) photon $\vec{\kappa}$ and photon $\vec{\kappa}'$ are annihilated at $\vec{\rho}_2$ and $\vec{\rho}_1$, respectively, and (2) photon $\vec{\kappa}'$ and photon $\vec{\kappa}$ are annihilated at $\vec{\rho}_2$ and $\vec{\rho}_1$, respectively. The interference phenomenon is not, as in classical optics, due to the superposition of electromagnetic fields at a local point of space time. It is due to the superposition of $g_2(\vec{\kappa}; \vec{\rho}_2)g_1(\vec{\kappa}'; \vec{\rho}_1)$ and $g_2(\vec{\kappa}'; \vec{\rho}_2)g_1(\vec{\kappa}; \vec{\rho}_1)$, the so-called two-photon amplitudes.

Completing the normal square of Eq. (8), it is easy to find that the sum of the normal square terms corresponding to the constant of $G_0$ in Eq. (2): $\Sigma_{\vec{\kappa}}|g_1(\vec{\kappa}; \vec{\rho}_1)|^2 \Sigma_{\vec{\kappa}'}|g_2(\vec{\kappa}'; \vec{\rho}_2)|^2 = G_{11}^{(1)} G_{22}^{(1)}$, and the cross term $|\Sigma_{\vec{\kappa}} g_1^*(\vec{\kappa}; \vec{\rho}_1)g_2(\vec{\kappa}; \vec{\rho}_2)|^2 = |G_{12}^{(1)}(\vec{\rho}_1, \vec{\rho}_2)|^2$ gives the δ function of position-position correlation $$\left| \int d\vec{\kappa} g_1^*(\vec{\kappa}; \vec{\rho}_1)g_2(\vec{\kappa}; \vec{\rho}_2) \right|^2 \simeq |\delta(\vec{\rho}_o + \vec{\rho}_i)|^2, \quad (9)$$

where $$g_1(\vec{\kappa}; \vec{\rho}_o) \propto \Psi\left(\vec{\kappa}, -\frac{c}{\omega}d_A\right)e^{i\vec{\kappa}\cdot\vec{\rho}_o}, \quad (10)$$

$$g_2(\vec{\kappa}; \vec{\rho}_i) \propto \Psi\left(\vec{\kappa}, -\frac{c}{\omega}d_B\right)e^{i\vec{\kappa}\cdot\vec{\rho}_i},$$

are the Green's functions propagated from the radiation source to the transverse planes of $d_A$ and $d_B=d_A$. In Eq. (11), $\psi(\omega d/c)$ is a phase factor representing the optical transfer function of the linear system under the Fresnel near-field paraxial approximation, ω is the frequency of the radiation field, and c is the speed of light.

Substituting this δ function together with the constant $G_0$ into Eq. (1), an equal sized lensless image of $A(\vec{\rho}_0)$ is observed in the joint detection between the CCD array and the photon counting detector $D_1$. The visibility of the image is determined by the value of $G_0$.

The inventive ghost images are thus successfully interpreted as the result of two-photon interference. The two-photon interference results in a point-point correlation between the object plane and the image plane and yields a ghost image of the object by means of joint photodetection.

An inventive imaging system is depicted generically in FIG. 4 and in exemplary actual imaging systems in FIGS. 5A, 6, 7A, 8A, 8B, 9, and 10 where like reference numerals used among the figures have like meaning. The optional detector 16" is omitted from FIGS. 5A, 6, 7A, 8A, 8B, 9, and 10 for visual clarity. A light source 12 is provided to emit photons. A light source 12 operative in the present invention provides quantum entangled photons or thermal photons and illustratively includes sunlight, thermalized laser light (partially coherent or chaotic), an artificial incoherent light source such as an incandescent light bulb, or an entangled photon source. The present invention may be practiced with a partially coherent, chaotic, incoherent or entangled light sources. The media through which photons emitted from the light source 12 travel includes air, water, and the vacuum of space, as well as evacuated light paths produced within a laboratory. A first portion of photons 13 emitted from the light source 12 contact an object 14 to be imaged. The photons 13 are reflected from the object 14 along light path 15. A spatially integrated detector 16 receives photons 15 for a period of time. The detector 16 integrates the received photons for the period of time to yield a bucket detector signal 17 that corresponds to integrated values of photonic intensity. The signal 17 is conveyed to a computer 18. A second portion of photonic light emission 21 from the light source 12 is received at a second spatially addressable detector 22 aimed at the light source 12. The second light emission portion 21 reaches the second detector 22 independent of interaction with the object. The detector 22 collects the emission 21 for a second period of time. To facilitate computation of a ghost image, preferably the integration period of time for the first detector 16 and the integration second period of time for the second detector 22 are the same. A trigger signal is conveyed from the computer 18 to initiate photon collection by the detectors, 16 and 22 and if present 16'. A spatially resolved signal 23 corresponding to spatially addressable intensity values for the emission 21 contacting the detector 22 are also conveyed to the computer 18. The computer 18 computes a two-photon correlation ghost image in accordance with Eq. (3) from the bucket detector signal 17 and the spatially resolved signal 23. A correlated two-photon quantum image is displayed on a monitor 25.

Each of the detectors 16 or 22 is illustratively, e.g., a single photon counting detector, light intensity detector, or a charge couple device. In the instance when both detectors 16 and 22 are charge coupled devices, this affords the additional feature of being able to modify the sensitivity of specific detector pixels on the bucket detector 16 prior to producing the bucket detector signal 17. In this way, a ghost image may be impressed by either turning off or turning on certain pixels in the shape of the object to be imaged prior to summation of the total number of photon counts impingent upon the charge couple device detector 16. It is further appreciated that pixels may be partially or fully sensitized to provide grayscales of an image which further can be modified with artificial color to provide still additional imaging detail.

Figure 5A:
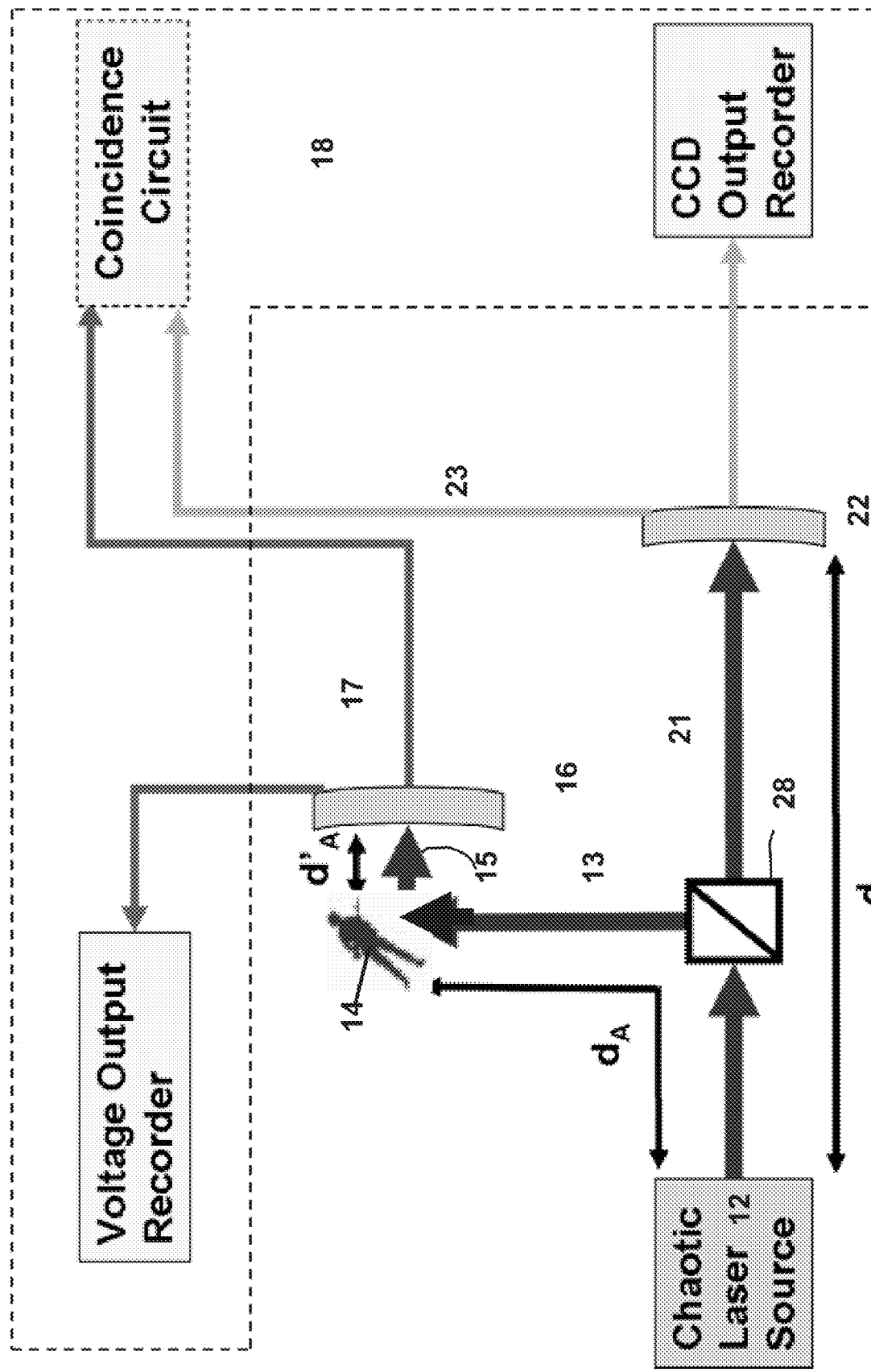
FIG. 5A is a schematic of an inventive quantum ghost imaging scheme, operating with entangled or thermal photons with reflection from an object.

FIG. 5A is a schematic of the present invention. Radiation from a chaotic pseudothermal source 12 is divided into two paths by a nonpolarizing beam splitter 26. In arm A, an object 14 is illuminated by the light source at a distance of $d_A$. A bucket detector 16 is used to collect and to count the photons that are reflected from the surface of the object. In arm B, a second spatially addressable detector 22 is deployed. A detector 22 includes a two-dimensional (2D) photon counting CCD array, cooled for single-photon detection, and may optionally include a lens. The detector 22 is placed at any given distance $d_B$. As shown in FIG. 5A, $d_A=d_B$. It is appreciated that the present invention is operative when $d_B$ does not equal $d_A$. The detector 22 faces the light source instead of facing the object 14. The bucket detector 16 is simulated by using a large area silicon photodiode for collecting the randomly scattered and reflected photons from the object 14. A triggering pulse from a computer is used to synchronize the measurements at 16 and 22 for two-photon joint detection. The time window is preferably chosen to match the coherent time of the radiation to simplify computation. The light intensity is also preferably chosen for each element of the detector 22 working at a single-photon level within the period of detector element response time. The chaotic light 12 is simulated by transmitting a laser beam first through a lens to widen the beam and then through a phase screen made from rotating ground glass. Meyers and colleagues in J. Mod. Opt. 54, 2381

(2007) have shown that a large transverse sized source gives better spatial resolution of the two-photon image.

Figure 5B:
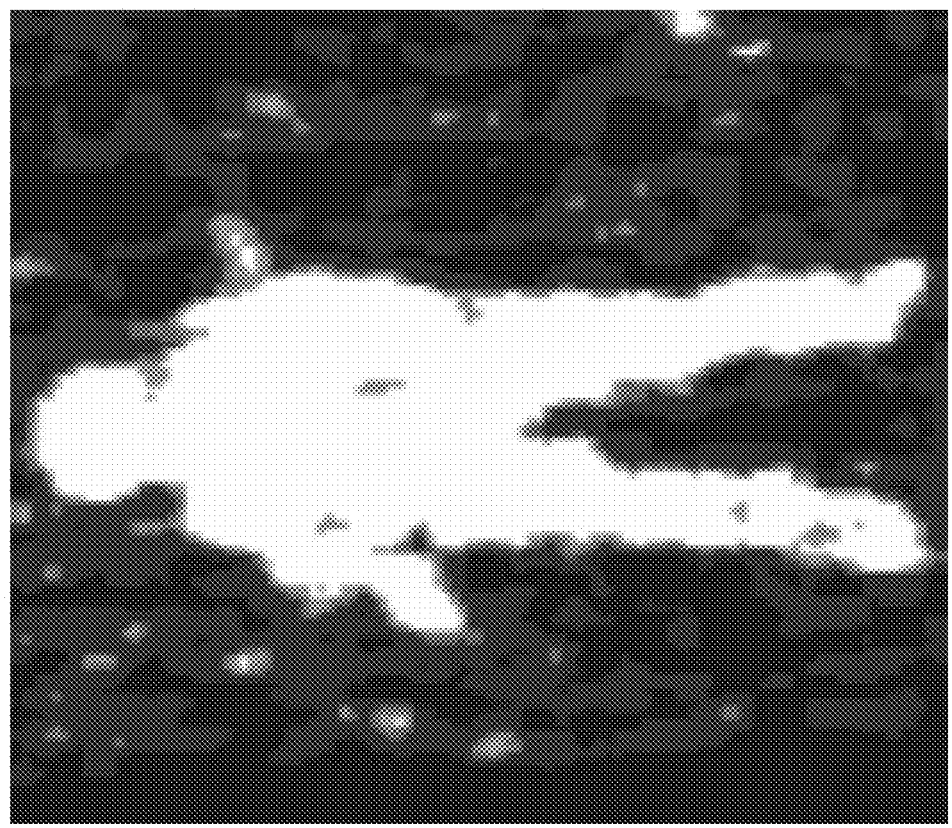
FIG. 5B is an actual ghost image display of an object from the scheme of FIG. 5A.

In FIG. 5A, the specific object 14 is a toy soldier. Additionally, FIG. 5A depicts electronic circuitry components of the computer 18 relative to the detectors 16 and 22. A coincidence circuit 28 provides detection coordination between detectors 16 and 22. A photon registration history for detector 16 is also provided at 30 and provides a temporal log for the integrated values 17 transmitted to the computer 18. The second spatially addressable detector 22 is provided with spatially addressable output 32 that is subsequently fed to computer 18 and onto display 25. For the optical bench schematic of FIG. 5A, the actual ghost image display on a monitor 25 is provided in FIG. 5B and is discernable as the original toy figure. It is appreciated that the image quality shown in FIG. 5B is improved by increasing photon flux along path 15.

Figure 6:
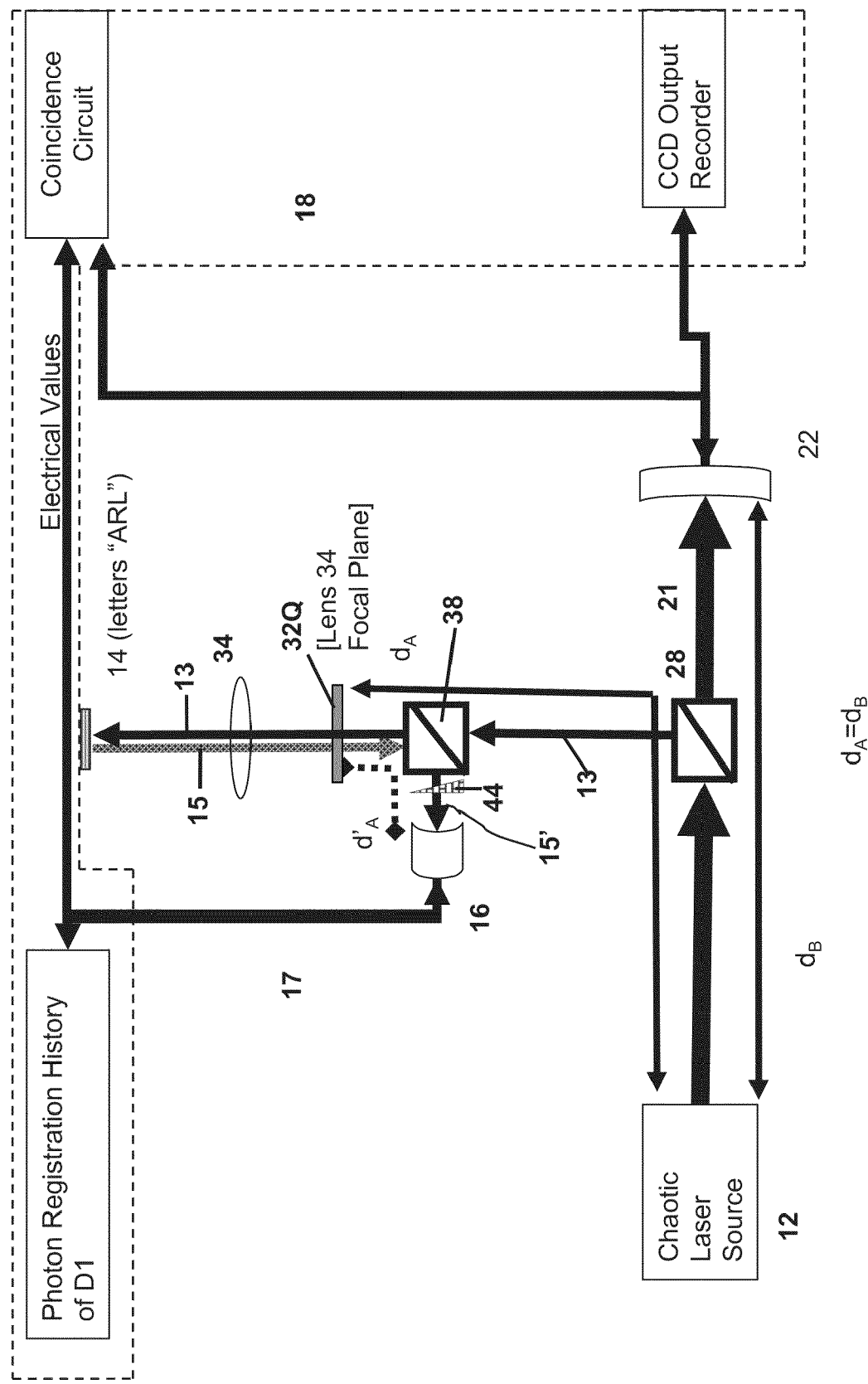
FIG. 6 is a schematic of an inventive quantum ghost imaging scheme using a lens to focus light reflected from a remote object.

FIG. 6 is a schematic of a ghost imaging scheme using a lens 34 to focus reflected light 15 from the object 14 to improve ghost image quality. Elements 28 and 38 are beam splitters and the focal plane of lens 34 is depicted as 32Q. The lens 34 is provided in the optical path such that optical path 13 (the light path of incident light to the object 14) and reflected light path 15 (from the object back to the beam splitter 28A) may be coextensive. The lens 34 has a focal point spatially removed from the detector 16 by a distance $d'_A$ and constitutes a corrective optical component. A beam splitter 38 otherwise similar to beam splitter 28 is also used to provide optical registry. The inclusion of a monochromometer 44 intermediate along the merge photon path 15' allows one to determine the spectroscopic properties of an object if entangled photon pairs of differing energies are used. Such spectroscopic information is helpful in determining the chemical composition of the object surface.

FIG. 7 is a schematic of an inventive ghost imaging scheme lacking a lens yet still providing coextensive optical paths 13 and 15 where like numerals correspond to those used with respect to FIG. 6. FIGS. 7B-7D show successive single frame output from the detector 23 (FIG. 7B), integrated output from detector 23 (FIG. 7C) and a ghost image as detected on monitor 25 upon combination of signals 17 and 23 (FIG. 7D). A phase screen 40 is provided as a corrective optical component intermediate between beam splitter 26 and detector 22. A suitable phase screen 40 operative herein includes, for example, a transmissive liquid crystal display.

Figure 7A:
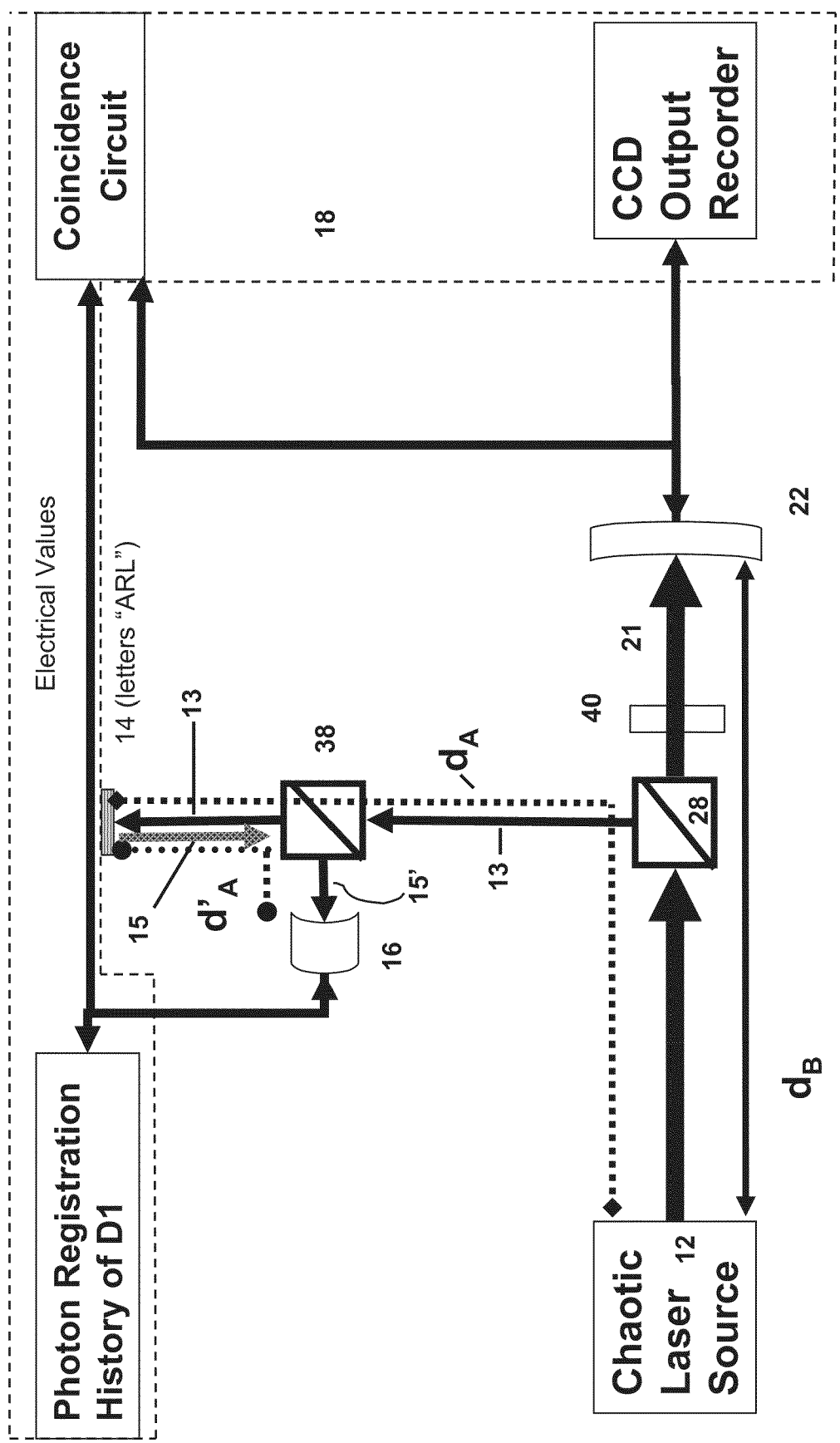
FIG. 7A is a schematic of an inventive lens-less quantum ghost imaging scheme using light reflected from an object.
Figure 7B:
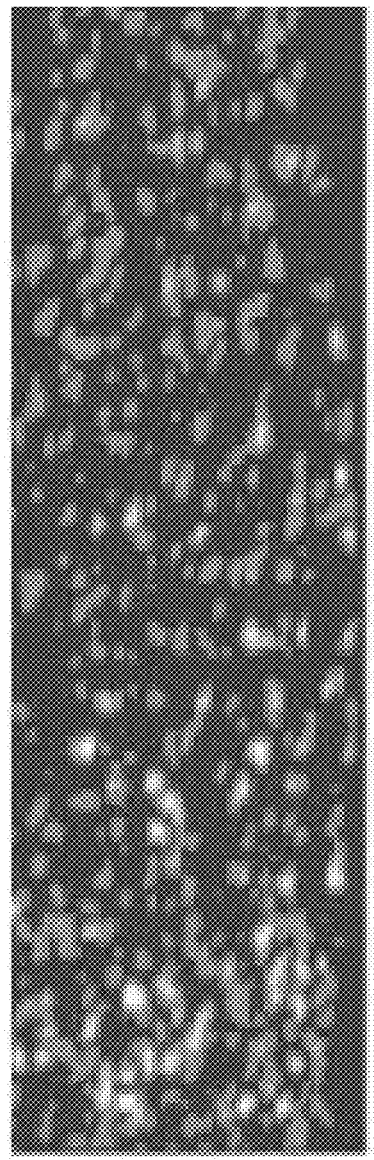
FIG. 7B is single frame CCD output; the "speckles" indicate typical random photodetection events.
Figure 7C:
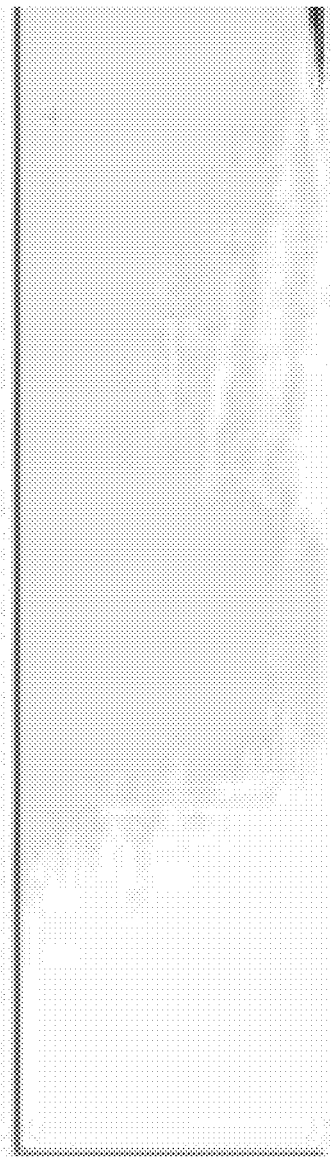
FIG. 7C is time averaged CCD output of a few hundred frames.
Figure 7D:
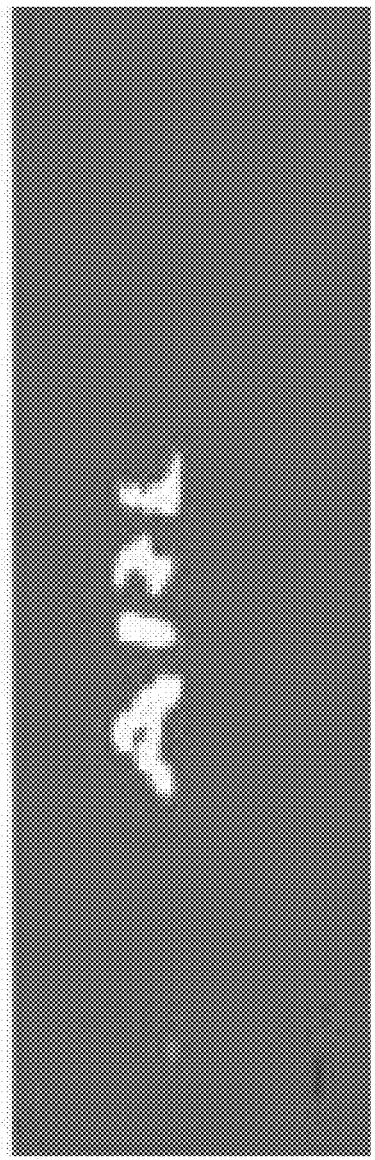
FIG. 7D is a ghost image CCD-$D_1$ joint detection.

It is appreciated that the optical schematics of FIGS. 6 and 7A are particularly well suited for instances when the photons 21 or 13 emitted by the light source 12 represent a stimulating incident light and reflected photons 15 from the object 14 are stimulated fluorescence light. It is appreciated that the stimulated fluorescence light in such instances is of a longer wavelength than the instant photons 13.

Figure 8A:
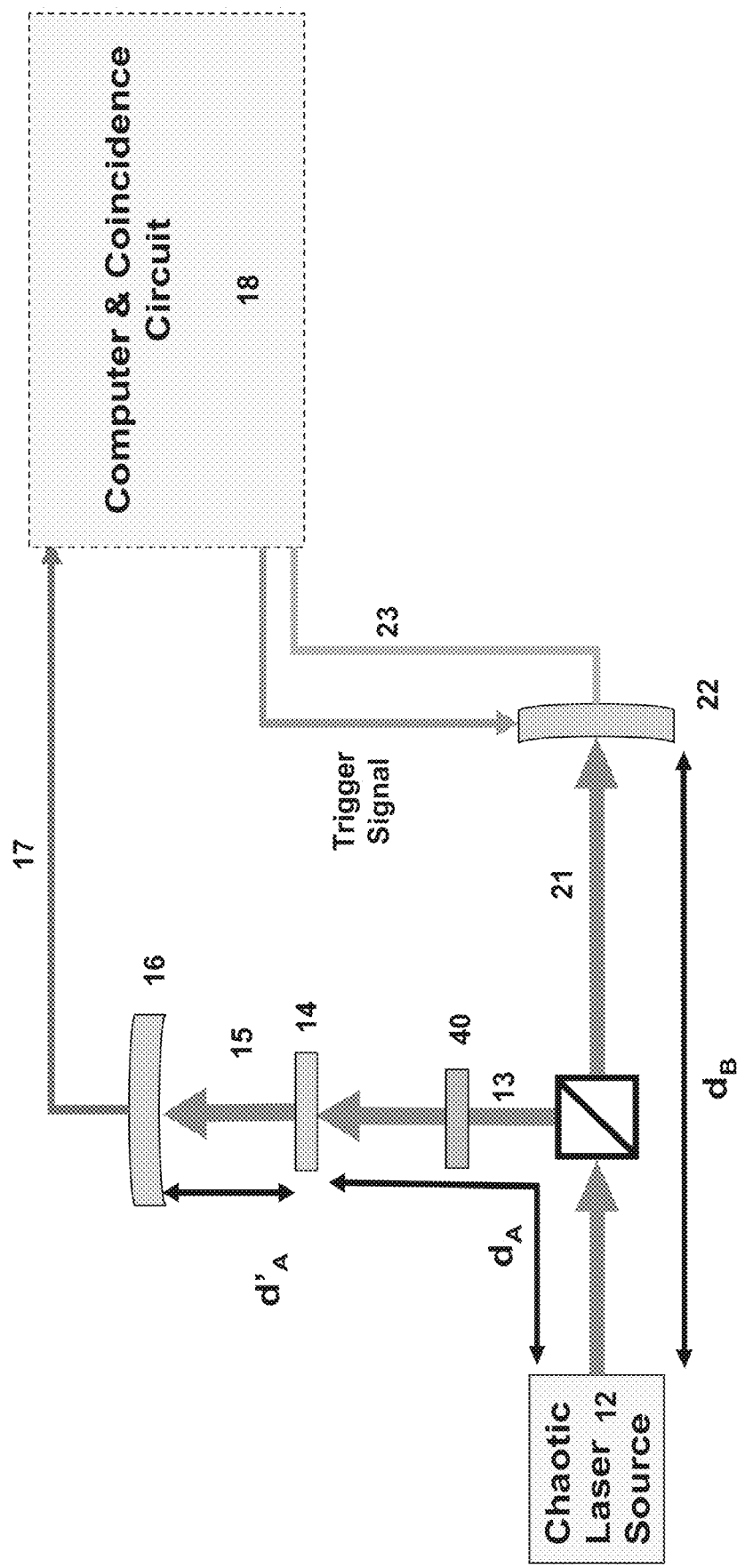
FIG. 8A is an illustrative schematic indicating that a quantum ghost image can be generated if there are phase aberrations in a path, using either transmitted or reflected photons.
Figure 8B:
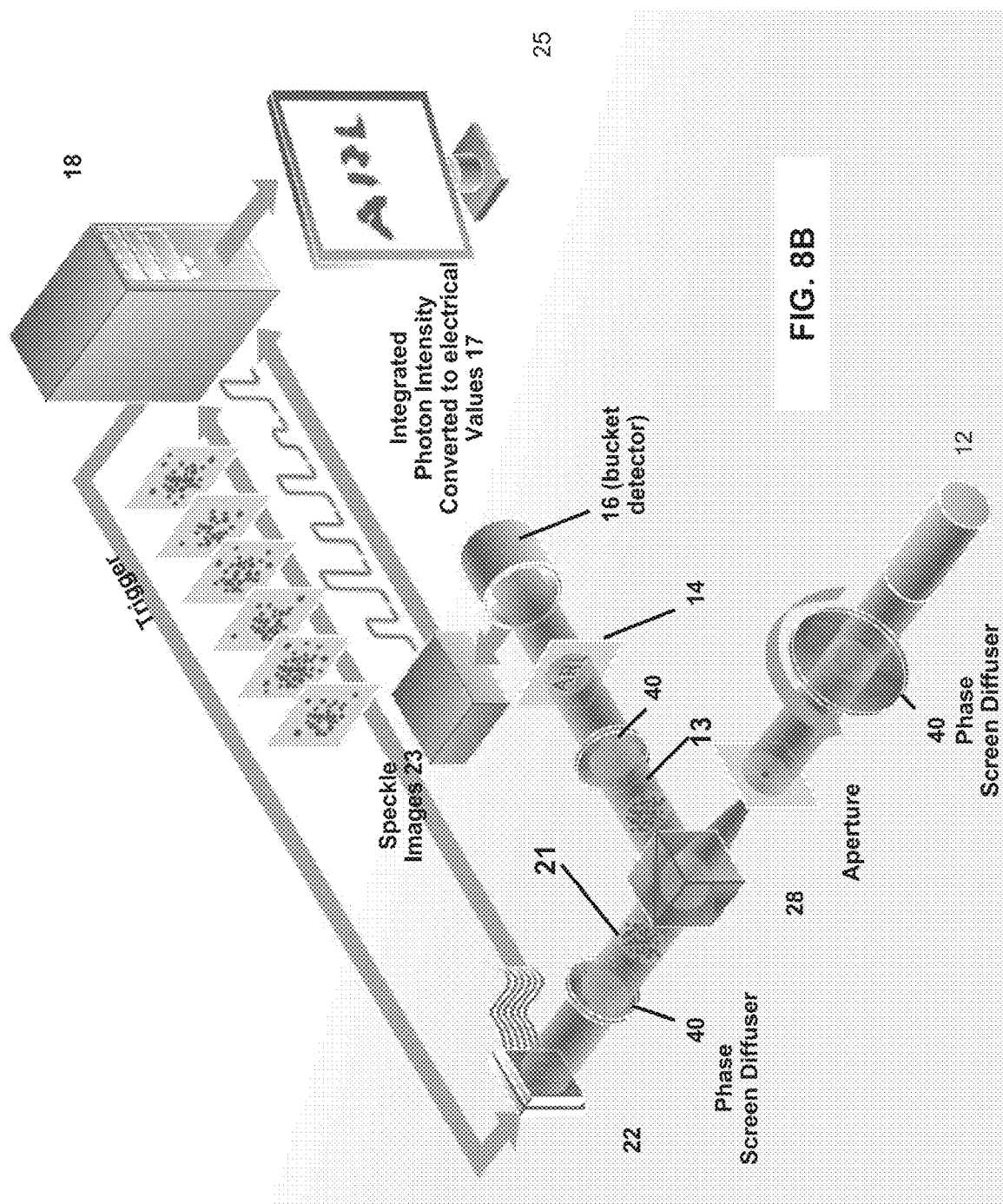
FIG. 8B is a perspective schematic view of quantum ghost imaging according to FIG. 8A with a partially transparent mask encoding the letters "ARL"

FIGS. 8A and 8B depict an inventive ghost imaging system in which the object is a semi-opaque mask 14' providing a transmissive photon output 46 to reach the bucket detector 16. In FIG. 8B, the mask 14' is a stencil of the letters "ARL". The detector 22 in this regime of FIGS. 8A and 8B is a two-dimensional charge couple device array that provides two-dimensional speckle data as the spatially addressable intensity values 23 to the computer 18 with gated electrical values being communicated to the computer 18 with gated exposure start and stop triggers being communicated to the detectors 16 and 22. The object 14' is located a distance $d'_A$ from the bucket detector 16.

In accordance with a preferred embodiment, as depicted in FIG. 8B, the laser source 12 in conjunction with the rotating phase screen diffuser 40, emits light uncorrelated in space and time. Thus, the speckle images 23 are random distributions in space and time. The beam splitter 28 essentially "halves" the intensity of the initial speckle image from diffuser 40 and splits it into two different paths (21 and 13) as shown in FIG. 8B. Spatially correlated means that correlations are present at any given instant of time between the two paths 13, 21. There will be a point to point correlation between the speckle images on each path, although paths are spatially distinct. The coincidence detection by the processor 18 is temporal; i.e. correlated at specific time intervals. "Correlation" or "Correlated," as used in the present application, means a logical or natural association between two or more paths; i.e., an interdependence, relationship, interrelationship, correspondence, or linkage. For example, the present invention may be used in conjunction with sunlight, an incoherent light source, whereby a first and second plurality of photons are emitted from the sun at the same time. If the first detector is located on the earth (ground) receives the first plurality of photons, and the second detector located in space (such as in a satellite orbiting the earth) receives a second plurality of photons, the time intervals need to be synchronized; i.e., a first plurality of photons which strikes the ground object is correlated with a second plurality of photons detected in space at synchronized timing intervals. It can be readily appreciated by those skilled in the art that if the detected samples from the first and second plurality of photons are not part of the correlation, it will not contribute to the $G^{(2)}$ image as mathematically described in the above equations. Further, coincidence has to do with two measurements at the same or approximately the same time. For example, when a coincidence occurs, one must compensate for the media involved to take into account the variation in particle velocity between different media.

FIG. 9 is a perspective schematic of a reflective ghost imaging scheme according to the present invention using light emitting diodes as a representative incoherent light source in a field setting and insensitive to transmission through obscuring medium.

Figure 10:
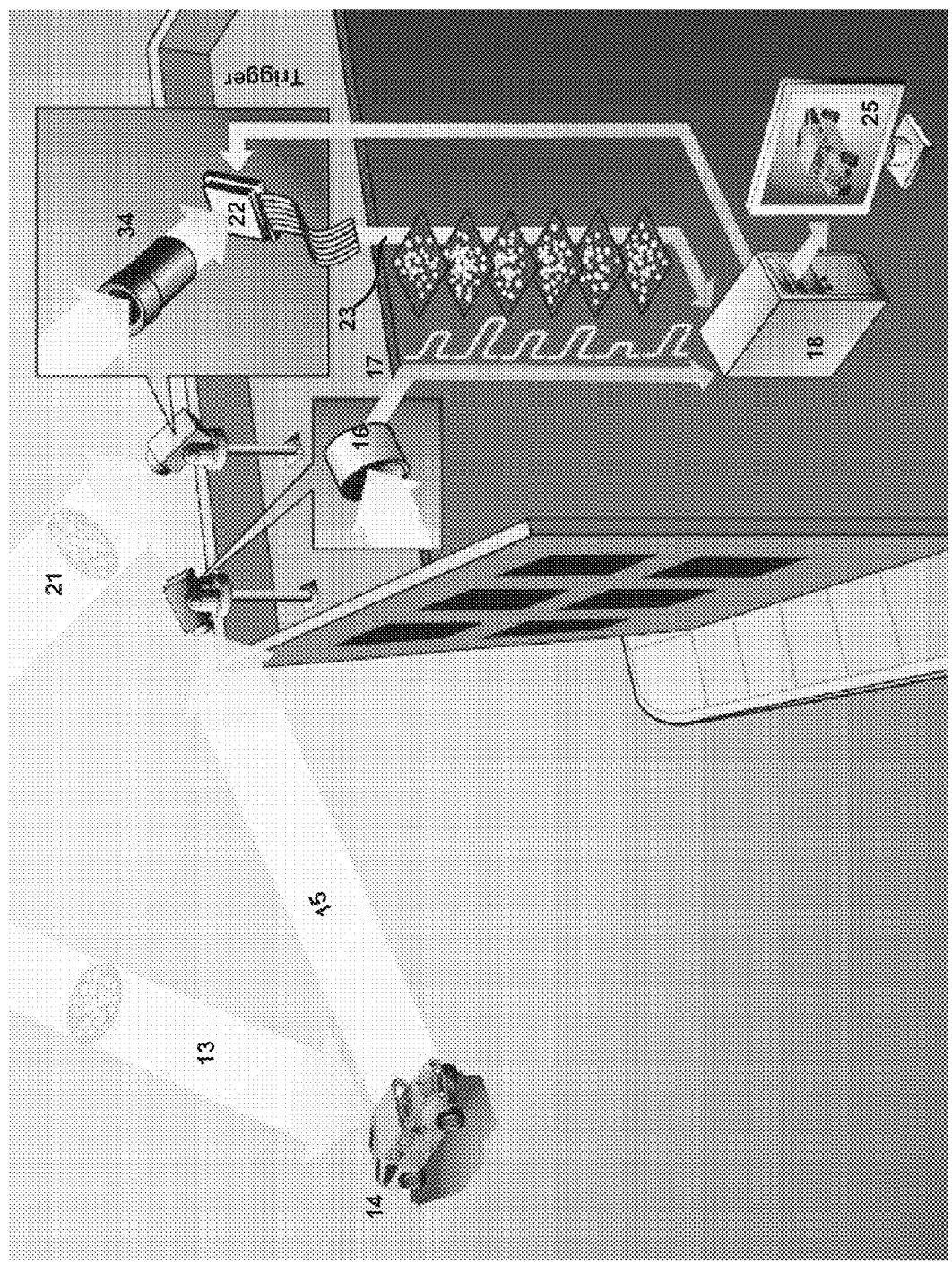
FIG. 10 is a perspective schematic view of the reflective ghost imaging scheme using solar light reflected from an object, depicted as a vehicle.

FIG. 10 is a perspective schematic of a reflective ghost imaging scheme according to the present invention using solar radiation as a light source. With insensitivity to obscuring medium. While FIG. 10 depicts an object 14 as a vehicle in a land setting with elevated position detectors 16 and 22, it is appreciated that the system is operative underwater and in other configurations.

Figure 11:
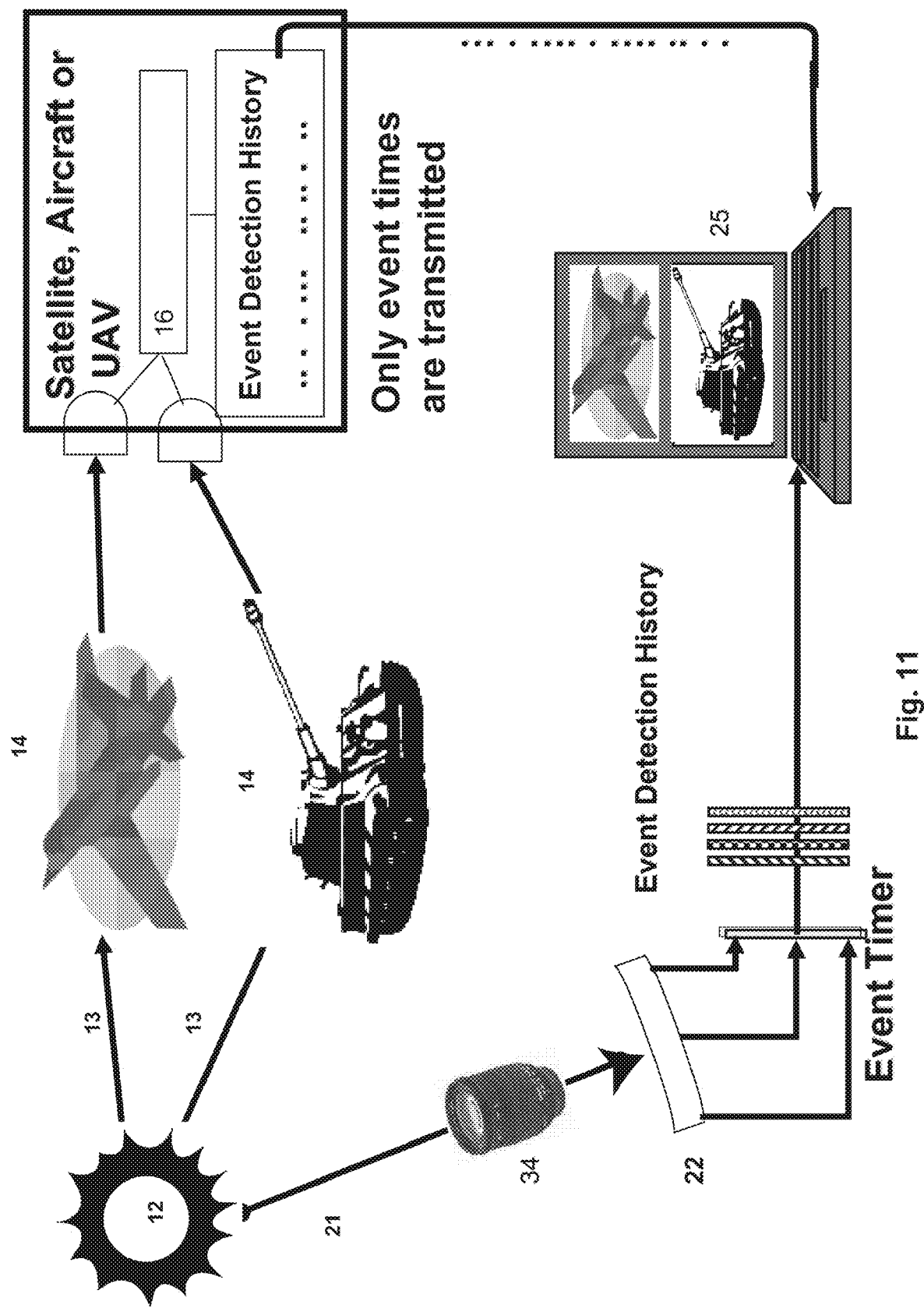
FIG. 11 is a diagram depicting the multiple object imaging qualities of the inventive quantum ghost imaging scheme operating with entangled or thermal photons protocol.

FIG. 11 is a diagram depicting multiple object imaging qualities of an inventive ghost imaging scheme operating with entangled or thermal photon protocols using solar radiation and with transmission from one or more detectors 16 or 16' to only transmit event detection history indicative of movement within an observation field according to selected detection parameters such as transit speed, vehicle size, or a combination thereof.

To confirm the ability to generate a ghost image of an object through an obscuring medium, an obscuring medium of frosted glass is inserted along the optical path 15 of FIG. 5A. FIG. 12A is an instantaneous image of the light source 12 collected on the detector 22. FIG. 12B is an averaged image of the light source 12 obtained from detector 22 on averaging of 100 such images according to FIG. 12A. FIG. 12C is a $G^{(2)}$ image of the object obtained by correlation to photon ghost imaging from signals 17 and 23. The instantaneous image of the obscured reflection object 14 is provided in FIG. 12D while the averaged image of the obscured reflection object 14 is provided in FIG. 12E and substantially corresponds to that depicted in FIG. 7D.

Figure 13:
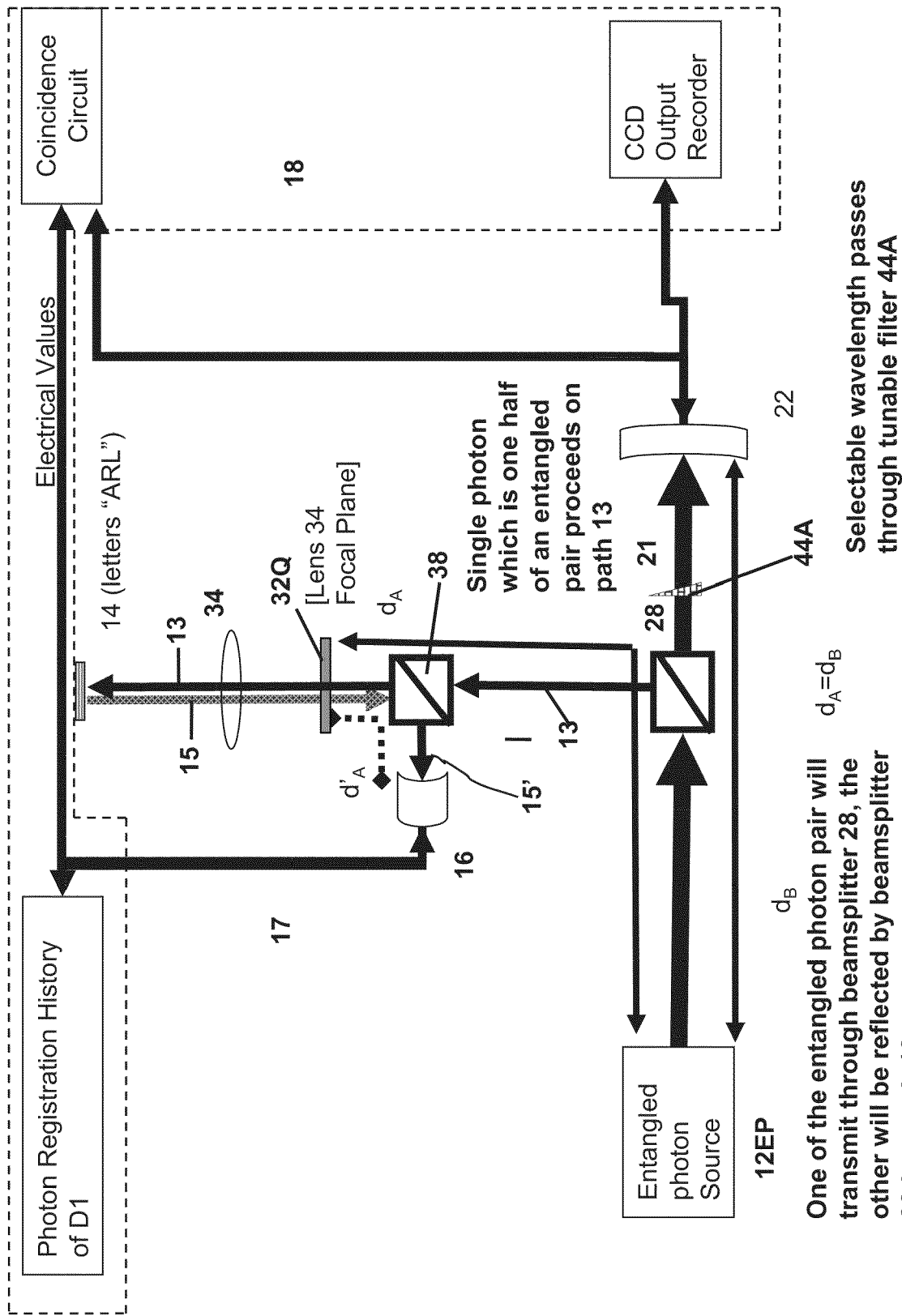

FIG. 13 is a further description of a preferred embodiment utilizing a broadband entangled photon source 12EP, from which light of various wavelengths is emitted in pairs. The light beam enters beam splitter 28 wherein one part of the entangled photon pair enters path 13 (to the object) and the other part of the photon pair enters path 21 to the detector 22. The target has an influence on the photon and acts to make a measurement or partial measurement on it such that a preponderance of measurements are in one type of outcome (say for example a color) may be performed. The other reference or kept photon which enters path 21 is measured and is found to have the conjugate property (for example, a conjugate color). Besides color, polarization techniques could be utilized as described in U.S. patent application Ser. No. 10/900,351, herein incorporated by reference. The stream of such entangled photons is generated and a ghost image is formed by weighting the referenced entangled photon with the, for example color, measurements. Optionally, this system may be utilized, for example, in conjunction with a spectrometer system 35S. Assuming that the target object 14 absorbs certain wavelengths of light, and the light which is reflected back via path 15 will be missing the absorbed wavelengths. In this example, by connecting path 21 to a photo counting spectrometer system 35S, it will process coincidences between what is reflected from object 14 and that which the spectrometer system 35S detects. From this correlation, one can determine by "dips" in coincidence measurement, the wavelengths which are absorbed by the object. By determining spectrographic information relating to different objects, one can determine the nature of the object and certain properties about its chemical composition. Using this preferred embodiment, both the image and spectrographic information is obtainable. Thus, what is not received back is as informative as that which is reflected. For example, if the target is wearing an infrared absorbing uniform, the interaction of the initial light beam 13 with the target 14 may contain infrared light which is not absorbed by target 14. One can then distinguish as whether or not a person is wearing infrared absorbing clothing from measuring the intensity of the reflected light at bucket detector 16. Such information can be used for identification of groups of individuals. Consequently, absorption profiles of different peoples may be maintained in absorbent, florescent, or transmission spectral databases. Furthermore, a system of this type provides an easy way to generate so-called multispectral images.

A preferred embodiment of the present invention may utilize a light source emitting radiation that is one of an entangled, thermal, or chaotic light source. The photons from the light source may be divided into two paths: one path for the object to be imaged, and the other path in which images of the entangled, thermal, or chaotic light are measured independent of interaction with the objects. Any or all paths may pass through an obscuring medium. The measurements of the entangled, thermal, or chaotic light may then stored for future processing. The light in the object path is collected into a bucket detector and measured. The measurements of the bucket detector are then stored for future processing. A process for solving for the $G^{(2)}$ Glauber coherence between the two paths is provided to reconstruct the image. The $G^{(2)}$ Glauber coherence between the two paths is used to generate a correlation two-photon ghost image.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention. As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art. As used in the foregoing claims, the term "subject" includes object(s), area, person(s), setting, place, mask, or scene.

The numbers in the drawing figures represent the following elements in the drawing figures.

Number Key

| | |
|---|---|
| random, spatially correlated light source | 12 |
| light source output | 13 |
| Object | 14 |
| semi-opaque mask | 14' |
| Reflected light from object (14) | 15 |
| bucket detector | 16 |
| Second bucket detector | 16' |
| Detector (16) electrical signal | 17 |
| Detector (16') electrical signal | 17' |
| Computer | 18 |
| light source output | 21 |
| a spatially addressable detector | 22 |
| Detector (22) electrical signal | 23 |
| Monitor | 25 |
| beam splitter | 28 |
| lens | 34 |
| beam splitter | 38 |
| phase screen | 40 |
| monochromometer | 44 |
| transmissive photon output | 46 |

What is claimed is:

1. A method for generating an image of a subject illuminated by a light source which can be an incoherent, partially coherent, chaotic or entangled light source comprising;

receiving light reflected from the subject into at least one first receiver at predetermined time intervals;

receiving light from the light source into at least one second receiver and detecting spatial information regarding the light source at corresponding time intervals independent of light from the subject;

the at least one first receiver and the at least one second receiver being operatively connected to at least one processor, transmitting a measured value correlating to the amount of light reflected from the subject at the predetermined intervals of time from at least one first receiver to at least one processor;

correlating the measured values from the at least one first receiver at the predetermined intervals of time with the spatial information derived from the at least one second receiver at the corresponding intervals of time;

creating an image of the subject based upon the correlated measured values and spatial information by combining the spatial information from at least one second receiver at predetermined intervals of time with the measured values from at least one first receiver at the corresponding intervals of time.

2. The method of claim 1 wherein the at least one second receiver is remotely located from the at least one first receiver and wherein the at least one second receiver receives no light which has been reflected by the subject.

3. The method of claim 1, wherein the step of receiving light reflected from the subject into a first receiver comprises receiving a first plurality of photons emitted from a light source and reflected from the subject into a spatially integrated detector at a first location; and wherein the step of receiving light from the light source into a second receiver comprises receiving a second plurality of photons emitted from the light source to produce a spatially resolved signal using a spatially addressable detector at a second location, the second plurality of photons reaching the second detector independent of interaction with the subject;

combining the bucket detector signal from the spatially intergrated detector and the spatially resolved signal at synchronized time intervals by using the equation:

$$G^{(2)}(\vec{\rho}_o,\vec{\rho}_i)=G_{11}^{(1)}(\vec{\rho}_1,\vec{\rho}_1)G_{22}^{(1)}(\vec{\rho}_2,\vec{\rho}_2)+G_{12}^{(1)}(\vec{\rho}_1,\vec{\rho}_2)G_{21}^{(1)}(\vec{\rho}_2,\vec{\rho}_1)$$

where $G_{11}^{(1)}G_{22}^{(1)}$ is approximately equal to $G_0$ and $G_0$ is a constant, and $G_{12}^{(1)}G_{21}^{(1)}$ is approximately equal to $\delta(\vec{\rho}_1,\vec{\rho}_2)$ where $\delta(\vec{\rho}_1,\vec{\rho}_2)$ represents the δ-function non-local position-position correlation; and $\rho_1$ and $\rho_2$ are the transverse spatial coordinates of the first and second detectors respectively; and displaying the created image for the subject.

4. The method of claim 1 wherein the light source is sunlight, thermalized laser light, or artificial incoherent light.

5. The method of claim 1 wherein the light source comprises entangled photons.

6. The method of claim 1 wherein the light received by the at least one first receiver comprises stimulated fluorescence light and the light received by the at least one second receiver comprises light stimulating the stimulated fluorescence light.

7. The method of claim 1 wherein the at least one first receiver comprises a plurality of spatially integrated detectors which receive angularly distinct reflections from the subject illuminated by the light source.

8. The method of claim 7 wherein the plurality of spatially integrated detectors receive light from a second subject illuminated by the light source.

9. The method of claim 1 wherein the light illuminating and reflected from the subject passes through an image obscuring medium and wherein the distortion caused by the obscuring medium is corrected prior to the displaying of an image.

10. The method of claim 9 wherein the obscuring medium is fog, an aerosol, particulate, turbulence, liquid, or frosted glass.

11. The method of claim 9 wherein the distortion caused by the obscuring medium is corrected through corrective optics prior to displaying the image.

12. The method of claim 3 further comprising directing at least one of the first plurality of photons or the second plurality of photons through a monochromator prior to the displaying the correlation two-photon ghost image.

13. The method of claim 1 wherein the at least one first receiver comprises a spatially integrated detector and the at least one second receiver comprises a second spatially addressable detector and wherein both of the spatially integrated detector and the second spatially addressable detector are the charged coupled devices, and wherein the spatially integrated detector further comprises means for modifying sensitivity of specific pixels on the spatially integrated detector prior to producing the bucket detector signal.

14. The method of claim 3 further comprising receiving the first plurality of photons and the second plurality of photons at synchronized timing intervals.

15. A system for transmitting image information comprising:
at least one processor for processing information;
at least one light source which illuminates a subject; the at least one light source emitting incoherent, partially coherent, chaotic or entangled light;
at least one first receiver for receiving light reflected from the subject operatively connected to the processor;
at least one second receiver for receiving light from the at least one light source operatively connected to the processor;
the at least one first receiver operative to detect the amount of light reflected from the subject and transmit a value correlating to the amount of light reflected from the subject at specific intervals of time to the processor;
the at least one second receiver comprising at least one second detector which detects and transmits spatial information regarding the at least one light source devoid of any input concerning the subject at specific intervals of time to the at least one processor;
the at least one processor operating to correlate the amount of the light collected by the first receiver at a specific interval of time with the spatial information derived from the second receiver at a correlating interval of time to create an image of the subject.

16. The system of claim 15 wherein the system is a ghost imaging system using light reflected from a subject and wherein said at least one first receiver comprises a spatially integrated detector receiving a plurality of photons emitted from the light source and reflected by the object over a period of time; and said at least one second receiver comprises a spatially addressable detector receiving a second plurality of photons emitted from the light source for the period of time, the second plurality of photons being independent of interaction with the object; and wherein the processor comprises a computer for creating an image from signals obtained from the spatially integrated detector and the spatially addressable detector; and adapted to display the image from the computer onto a monitor.

17. The system of claim 15 wherein the at least one first receiver detects the light reflected from the subject without spatial information.

18. The system of claim 15 wherein the at least one first receiver collects the amount of light reflected from the subject and does not record or collect spatial information concerning the internal features, outline or dimensions of the subject.

19. The system of claim 18 wherein the at least one second receiver collects spatial information concerning the light source which is transmitted to the at least one processor and wherein the at least one processor creates the internal features, outline or dimensions of the subject based on the spatial information from the light source received by the at least one second receiver in combination with the amount of light measured by the at least one first receiver during corresponding time intervals.

* * * * *